(12) United States Patent
Jeon et al.

(10) Patent No.: US 11,132,078 B2
(45) Date of Patent: Sep. 28, 2021

(54) ELECTRONIC DEVICE

(71) Applicant: Samsung Display Co., Ltd., Yongin-si (KR)

(72) Inventors: Byeongkyu Jeon, Busan (KR);
Hyungchul Kim, Hwaseong-si (KR);
Jungmok Park, Hwaseong-si (KR);
Heewoong Park, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/789,926

(22) Filed: Feb. 13, 2020

(65) Prior Publication Data

US 2020/0183513 A1 Jun. 11, 2020

Related U.S. Application Data

(63) Continuation of application No. 15/643,816, filed on Jul. 7, 2017, now Pat. No. 10,592,016.

(30) Foreign Application Priority Data

Sep. 9, 2016 (KR) .................. 10-2016-0116782

(51) Int. Cl.
*G06F 3/041* (2006.01)

(52) U.S. Cl.
CPC ............ *G06F 3/041* (2013.01); *G06F 3/0412* (2013.01); *G06F 2203/04112* (2013.01)

(58) Field of Classification Search
CPC .... G06F 3/044; H03K 17/962; H03K 17/955; H03K 17/9645; G01D 5/24
See application file for complete search history.

(56) References Cited

U.S. PATENT DOCUMENTS 6,654,071 B2 11/2003 Chen
7,877,707 B2 * 1/2011 Westerman ........... G06F 3/0488
715/863

(Continued)

FOREIGN PATENT DOCUMENTS

JP 5514674 6/2014
KR 10-1196629 11/2012

(Continued)

OTHER PUBLICATIONS

European search report dated Jan. 15, 2018, in European Patent Application No. 17189539.4.

(Continued)

*Primary Examiner* — William Lu
(74) *Attorney, Agent, or Firm* — H.C. Park & Associates, PLC

(57) ABSTRACT

An electronic device including a base member having a touch area defined inside a first closed-shape, the first closed-shape being a first imaginary line, and a peripheral area disposed adjacent to the touch area and defined outside the first closed-shape, and a touch sensor including a plurality of patterns disposed in the touch area to sense a touch from outside and a driving line disposed in the peripheral area and connected to a pattern disposed adjacent to the first closed-shape. The touch area includes a first area defined inside a second closed-shape being a second imaginary line defined in the touch area, and a second area defined outside the second closed-shape and surrounded by the first closed-shape, and an edge pattern disposed in the second area having an area substantially equal to or greater than approximately one-half of an area of a center pattern disposed in the first area.

26 Claims, 25 Drawing Sheets

(56) References Cited

U.S. PATENT DOCUMENTS

| | | | |
|---|---|---|---|
| 8,692,791 B2* | 4/2014 | Kim | G06F 3/0416 345/173 |
| 9,092,097 B2 | 7/2015 | Kang | |
| 9,244,568 B2 | 1/2016 | Philipp | |
| 9,304,538 B2 | 4/2016 | Aaltonen et al. | |
| 9,772,722 B2 | 9/2017 | Tucker et al. | |
| 9,898,115 B2* | 2/2018 | Wu | G06F 3/0443 |
| 9,910,544 B1* | 3/2018 | Yarosh | G06F 3/0418 |
| 9,965,119 B2* | 5/2018 | Lee | G02F 1/13338 |
| 9,965,995 B2 | 5/2018 | Chen | G09G 3/2092 |
| 9,983,743 B2* | 5/2018 | Yan | G06F 3/0412 |
| 10,139,974 B2* | 11/2018 | Hong | G06F 3/0416 |
| 10,781,128 B2 | 9/2020 | An et al. | |
| 2011/0109587 A1* | 5/2011 | Ferencz | G06F 3/04812 345/174 |
| 2012/0047958 A1 | 3/2012 | Goller et al. | |
| 2012/0206381 A1* | 8/2012 | Pereverzev | G06F 3/041 345/173 |
| 2013/0015865 A1 | 1/2013 | Izumi | |
| 2013/0050123 A1 | 2/2013 | Lien et al. | |
| 2013/0076669 A1* | 3/2013 | Ando | G06F 3/04886 345/173 |
| 2013/0106751 A1* | 5/2013 | Wang | G06F 3/044 345/173 |
| 2013/0241850 A1* | 9/2013 | Ito | G06F 3/045 345/173 |
| 2013/0299222 A1 | 11/2013 | Lee et al. | |
| 2014/0228115 A1* | 8/2014 | Kaplan | A63F 13/52 463/31 |
| 2015/0022738 A1* | 1/2015 | Chou | G06F 3/044 349/12 |
| 2015/0071465 A1* | 3/2015 | Zalisk | G05G 1/01 381/105 |
| 2015/0123915 A1* | 5/2015 | Iwaizumi | G06F 3/041 345/173 |
| 2015/0253736 A1* | 9/2015 | Watterson | G16H 40/67 368/10 |
| 2016/0018927 A1* | 1/2016 | Ding | G09G 3/3614 345/174 |
| 2016/0034133 A1* | 2/2016 | Wilson | G06F 1/163 715/772 |
| 2016/0048246 A1* | 2/2016 | Park | G06F 3/04164 345/173 |
| 2016/0085334 A1* | 3/2016 | Hashimoto | G06F 3/044 345/174 |
| 2016/0098120 A1* | 4/2016 | Miyake | G06F 3/0446 345/174 |
| 2016/0231865 A1* | 8/2016 | Harrison | G06T 7/136 |
| 2016/0239131 A1* | 8/2016 | Kang | G06F 3/044 |
| 2016/0253050 A1* | 9/2016 | Mishra | G06F 3/0362 715/727 |
| 2016/0350933 A1* | 12/2016 | Schieke | G16H 30/40 |
| 2017/0359233 A1* | 12/2017 | Chen | G06Q 30/04 |
| 2018/0018751 A1* | 1/2018 | Jiang | G06T 1/20 |
| 2018/0067639 A1* | 3/2018 | Balaram | G06F 3/0485 |
| 2018/0232087 A1* | 8/2018 | Wu | G04G 21/08 |

FOREIGN PATENT DOCUMENTS

| | | |
|---|---|---|
| KR | 10-2014-0054903 | 5/2014 |
| KR | 10-2015-0072492 | 6/2015 |

OTHER PUBLICATIONS

Non-Final Office Action dated Nov. 9, 2018, in U.S. Appl. No. 15/643,816.
Final Office Action dated Mar. 1, 2019, in U.S. Appl. No. 15/643,816.
Non-Final Office Action dated Jun. 18, 2019, in U.S. Appl. No. 15/643,816.
Notice of Allowance dated Nov. 7, 2019, in U.S. Appl. No. 15/643,816.
Final Office Action dated Jan. 13, 2021, issued in U.S. Appl. No. 16/788,939.
Notice of Allowance dated Mar. 22, 2021, issued to U.S. Appl. No. 16/788,939.

* cited by examiner

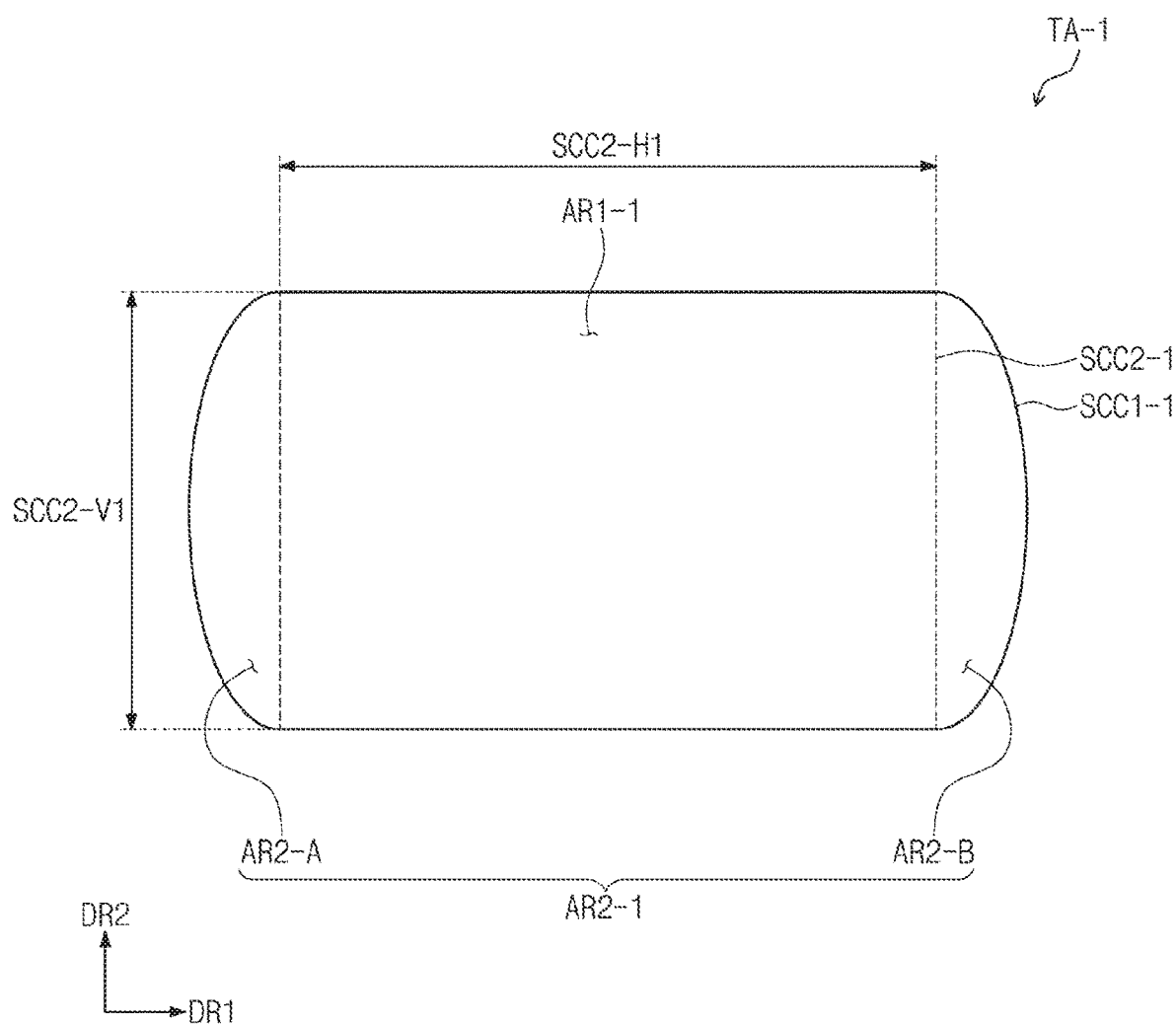

ELECTRONIC DEVICE

CROSS-REFERENCE TO RELATED APPLICATION

This application is a Continuation of U.S. patent application Ser. No. 15/643,816, filed on Jul. 7, 2017, and claims priority from and the benefit of Korean Patent Application No. 10-2016-0116782, filed on Sep. 9, 2016, which is hereby incorporated by reference for all purposes as if fully set forth herein.

BACKGROUND

Field

The invention relates generally to an electronic device, and, more particularly, to an electronic device having a touch screen display with improved touch sensitivity.

Discussion of the Background

An electronic device includes an active area activated by an electrical signal. The electronic device senses a touch from the outside by a user and substantially simultaneously displays various images to the user.

The electronic device has the active area allocated thereto. In recent years, with the development of electronic devices having various shapes and small, portable sizes, the active area responsive to touch input from a user has been implemented with various irregular and/or small shapes.

The above information disclosed in this Background section is only for enhancement of understanding of the background of the inventive concepts, and, therefore, it may contain information that does not form the prior art that is already known in this country to a person of ordinary skill in the art.

SUMMARY

The inventors have discovered that, when the active area includes a portion having an irregular and/or curved shape, touch sensitivity can be uneven over the active area, particularly in areas adjacent to the irregular and/or curved shape. Electronic devices constructed according to the principles of the invention overcome this problem and provide an electronic device having improved touch sensitivity in a touch area having non-uniform shapes.

Additional aspects will be set forth in the detailed description which follows, and, in part, will be apparent from the disclosure, or may be learned by practice of the inventive concepts.

According to a first aspect of the invention, an electronic device includes a base member having a touch area defined inside a first closed-shape, the first closed-shape being a first imaginary line, and a peripheral area disposed adjacent to the touch area and defined outside the first closed-shape, and a touch sensor having a plurality of patterns disposed in the touch area to sense a touch from outside and a driving line disposed in the peripheral area and connected to a pattern disposed adjacent to the first closed-shape. The touch area includes a first area defined inside a second closed-shape, the second closed-shape being a second imaginary line defined in the touch area, and a second area defined outside the second closed-shape and surrounded by the first closed-shape. An edge pattern is disposed in the second area having an area substantially equal to or greater than about one-half of an area of a center pattern disposed in the first area.

The second closed-shape may have a polygonal shape defined by a plurality of vertices and a plurality of sides that are straight lines and connect the vertices.

Each of the vertices may be overlapped with the first closed-shape.

The second area may be surrounded by a side connecting the vertices overlapped with a portion of the first closed-shape that is the curved line.

The first closed-shape may include a first portion that is the curved line and a second portion that is a straight line, and one side of the second closed-shape is parallel and overlapped with the second portion.

The first closed-shape may have a circular shape or an oval shape, which circumscribes in the second closed-shape, and the second area includes a plurality of areas surrounded by the sides of the second closed-shape.

At least one side portion of the edge pattern may be adjacent to the portion of the first closed-shape.

The at least one side portion of the edge pattern may have a curved line shape.

The plurality of patterns may further include an overlap pattern overlapped with one of the plurality of sides of the second closed-shape, the overlap pattern being overlapped with each of the first area and the second area, and the edge pattern being electrically connected to the overlap pattern.

The overlap pattern may have a shape substantially linearly symmetrical with respect to the one of the plurality of sides.

The overlap pattern may have substantially the same shape as the center pattern.

The second closed-shape may have a square shape, the first area may include a plurality of first unit areas arranged in a matrix form defined by a plurality of third imaginary lines each extending in a direction parallel to the one of the plurality of sides and a plurality of fourth imaginary lines each extending in a direction intersecting the one of the plurality of sides, and each of the first unit areas may be overlapped with a portion of each of four center patterns disposed adjacent to each other.

Diagonal lines of each of the first unit areas may define an outer portion of each of the center patterns closest to the first closed-shape.

The second area may include a plurality of second unit areas distinguished from each other by the fourth imaginary lines and arranged in a line along the one of the plurality of sides, and each of the second unit areas is overlapped with a portion of the overlap pattern, a portion of the edge pattern, and portions of two intermediate patterns disposed between the overlap pattern and the edge pattern and electrically insulated from the overlap pattern and the edge pattern.

An area of one center pattern with respect to one of the first unit areas may be substantially equal to an area of another center pattern of the first unit area.

An area of one edge pattern of the second unit areas may be substantially equal to or greater than an area of the overlap pattern.

The second area may further include a plurality of third unit areas spaced apart from each other such that the second unit areas are disposed between the third unit areas, each of the third unit areas is surrounded by one of the fourth imaginary lines, the one of the plurality of sides of the second closed-shape, and the one portion of the first closed-shape, and each of the third unit areas is adjacent to each of two patterns electrically insulated from each other.

The patterns may include a plurality of first sensor patterns arranged in the direction in which the one of the plurality of sides extends, a plurality of first connection patterns each extending in the direction in which the one of the plurality of sides extends to connect the first sensor patterns adjacent to each other, a plurality of second sensor patterns arranged in a direction intersecting the one of the plurality of sides, and a plurality of second connection patterns each extending in the direction intersecting the one of the plurality of sides and being insulated from the first connection patterns while intersecting the first connection patterns to connect the second sensor patterns adjacent to each other, and each of the edge pattern, the overlap pattern, and the center pattern is one of the first sensor patterns and the second sensor patterns.

The overlap pattern and the edge pattern may respectively correspond to two second sensor patterns connected to each other by one of the second connection patterns.

The driving line may be disposed along the first closed-shape to be adjacent to the touch area.

Each of the driving line and the edge pattern may be provided in a plural number, and at least one edge pattern of the edge patterns is connected to one of the driving lines.

One of the edge patterns may include a sensing portion overlapped with the touch area and a joining portion extending from the sensing portion to the peripheral area, and the one driving line of the driving lines being connected to the joining portion.

The electronic device may further include a pixel part disposed on the base member to display an image, the pixel part including a plurality of pixels.

The pixel part may be disposed between the touch sensor and the base member or on the touch sensor.

The first closed-shape may be a closed shape defined at least in part by a curved line and the second closed-shape may be a closed shape defined at least in part by a straight line.

According to a second aspect of the invention, an electronic device includes a base member including a touch area defined inside a first closed-shape having a circular shape and a peripheral area disposed adjacent to the touch area and defined outside the first closed-shape and a touch sensor including a plurality of sensor patterns disposed in the touch area a plurality of driving lines electrically connected to the sensor patterns and disposed in the peripheral area. The touch area includes a first area defined inside a second closed-shape having a regular polygonal shape inscribed in the circular shape and a second area defined outside the second closed-shape, including edge patterns including one side portion adjacent to the first closed-shape, at least some of the edge patterns have an area substantially equal to or greater than approximately one-half of an area of each of center patterns disposed in the first area.

The second closed-shape may have a square shape defined by two sides extending in a first direction and two sides extending in a second direction substantially perpendicular to the first direction.

The first area may include a plurality of first unit areas arranged in a matrix form defined by the first and second directions, the second area includes a plurality of second unit areas arranged in the first direction or the second direction, and an area of each of the center patterns of the first unit areas is substantially equal to approximately one-half of an area of another center pattern.

The patterns may further include a plurality of overlap patterns arranged in the first direction or the second direction, and each of the overlap patterns is overlapped with each of the first and second areas.

One second unit area may be overlapped with one overlap pattern and one edge pattern, and an area of the one edge pattern of the second unit area is substantially equal to or greater than the area of the one overlap pattern.

According to the above, in the touch area defined by the outer line including the simple closed curve in which at least the portion thereof is curved, the touch sensitivity in the edge area may be improved so to be closer to the touch sensitivity in the center area. Accordingly, the electronic device may have more uniform touch sensitivity in the entire area regardless of the shape of the touch area.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concepts, and are incorporated in and constitute a part of this specification, illustrate exemplary embodiments of the inventive concepts, and, together with the description, serve to explain principles of the inventive concepts.

FIG. 10A, FIG. 10B, FIG. 10C, FIG. 10D, FIG. 10E and FIG. 10F are plan views of the electronic device shown in FIG. 9 illustrating an exemplary touch sensing unit.

DETAILED DESCRIPTION OF THE ILLUSTRATED EMBODIMENTS

Figure 1:
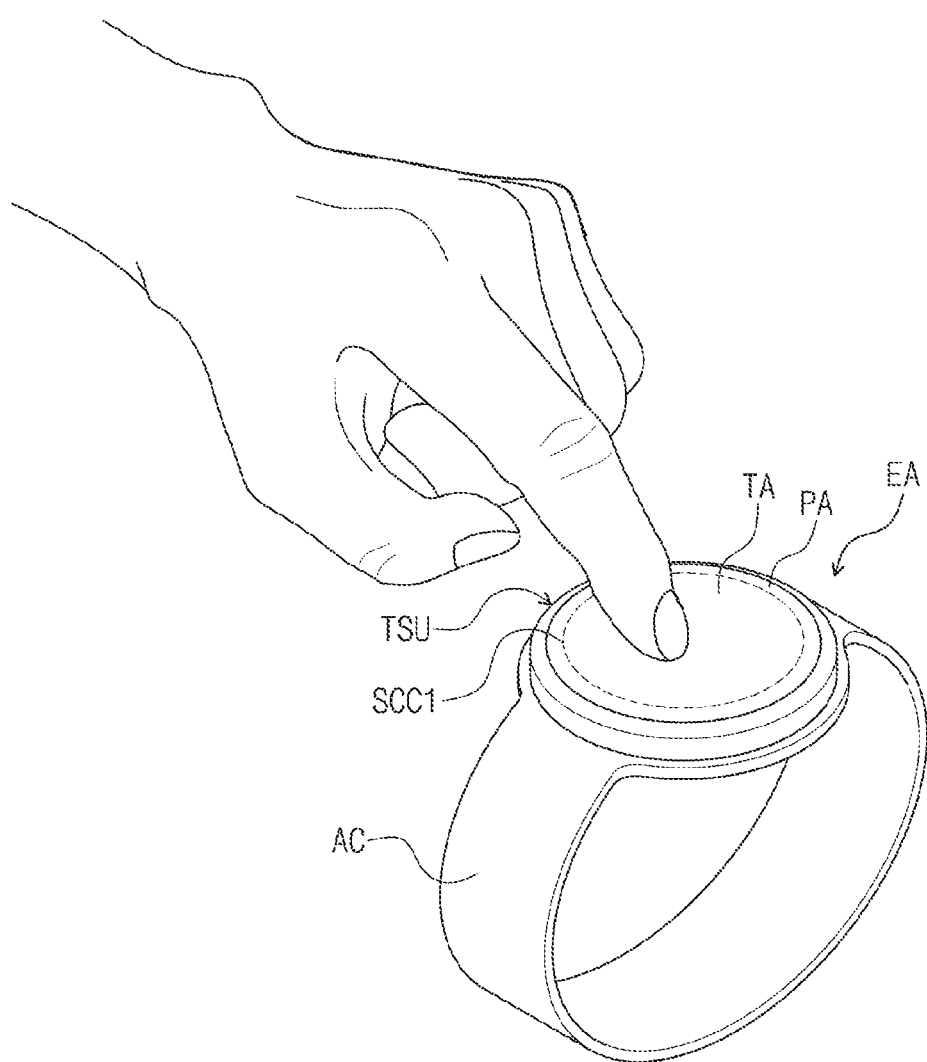
FIG. 1 is a perspective view showing an exemplary electronic device constructed according to the principles of the invention in a state of use.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Hereinafter, electronic devices constructed according to the principles of the invention will be explained in detail with reference to the accompanying drawings. Meanwhile, lines used to distinguish areas from each other or imaginary lines used to define components are shown to be spaced apart from other components or lines adjacent thereto, but the lines and the imaginary lines may substantially coincide with outer lines of other components.

Referring to FIG. 1, an electronic device EA includes a touch sensing unit TSU and an additional unit AC.

The touch sensing unit TSU senses a touch from the outside. The touch from the outside may be provided through various ways. The touch sensing unit TSU may sense a state, in which a portion (e.g., finger) of a user approaches to or makes contact with the touch sensing unit TSU, as the touch. In addition, the touch sensing unit TSU may sense a state, in which a portion (e.g., the tip) of an object (such as a stylus pen) approaches to or makes contact with the touch sensing unit TSU, as the touch. The touch sensing unit TSU may sense the touch from the outside in various ways known in the art. The foregoing are merely two examples.

The touch sensing unit TSU includes a touch area TA and a peripheral area PA that is different than the touch area TA when viewed in a plan view. The touch area TA may be, but is not limited to, an active area activated by an electrical signal. The electronic device EA may sense the touch occurring in the touch area TA through the electrical signal.

The touch area TA may be defined by a first closed-loop SCC1 that is an imaginary line or outline described in greater detail below. The first closed-loop SCC1 may have a closed contour shape. This closed contour shape may include straight lines, one or more curved lines, or a combination of straight lines and curved lines. The closed contour shape may be a simple shape such as a circle, a square, a rectangle, an oval with straight sides, an oval with no straight sides; or, the closed contour shape may be more complex with several different curves and/or straight lines. As used herein, the term closed contour should be understood to include both simple and complex shapes, and to include shapes having only straight lines, only curved lines, or a combination of straight and curved lines. As shown in FIG. 1, the first closed-loop SCC1 is a simple closed curve in which at least a side portion thereof is formed in a curved line. The touch area TA may be defined by the first closed-loop SCC1.

In the embodiment shown, the touch area TA has a substantially circular shape, but the shape of the touch area TA should not be limited to the circular shape. The touch area TA according to other embodiments may be defined by a closed-loop having various simple or complex closed contour shapes, e.g., an oval shape, a semi-circular shape, and other shapes incorporating a curved shape.

The peripheral area PA is disposed adjacent to the touch area TA. The peripheral area PA may be defined outside the first closed-loop SCC1. The peripheral area PA may surround the touch area TA. Since the touch area TA has the circular shape in the depicted embodiment, the peripheral area PA may have a ring shape, but the shape of the peripheral area PA should not be limited to the ring shape. According to other embodiments, the peripheral area PA may have various shapes making contact with at least a side portion of the touch area TA.

The additional unit AC is physically connected to the touch sensing unit TSU. The additional unit AC may fix the touch sensing unit TSU to an outer object outside of the touch sensing unit TSU. The additional unit AC may fix the touch sensing unit TSU to a body of the user. As another example, the addition unit AC may be a component in which additional parts, such as a driving circuit driving the touch sensing unit TSU or a power supply, are accommodated. The additional unit AC may be omitted from the electronic device EA in some embodiments.

The electronic device EA shown includes the touch area TA defined by an outer line in which at least the side portion thereof is formed in the curved line. The electronic device EA may provide a uniform touch sensitivity in the touch area TA. Accordingly, the user may touch various positions in the touch area TA regardless of the shape of the touch area TA, and thus the user may freely use the electronic device EA. This will be described in detail later.

Hereinafter, the touch sensing unit TSU will be described in detail with reference to FIGS. 2 to 3B.

Figure 2:
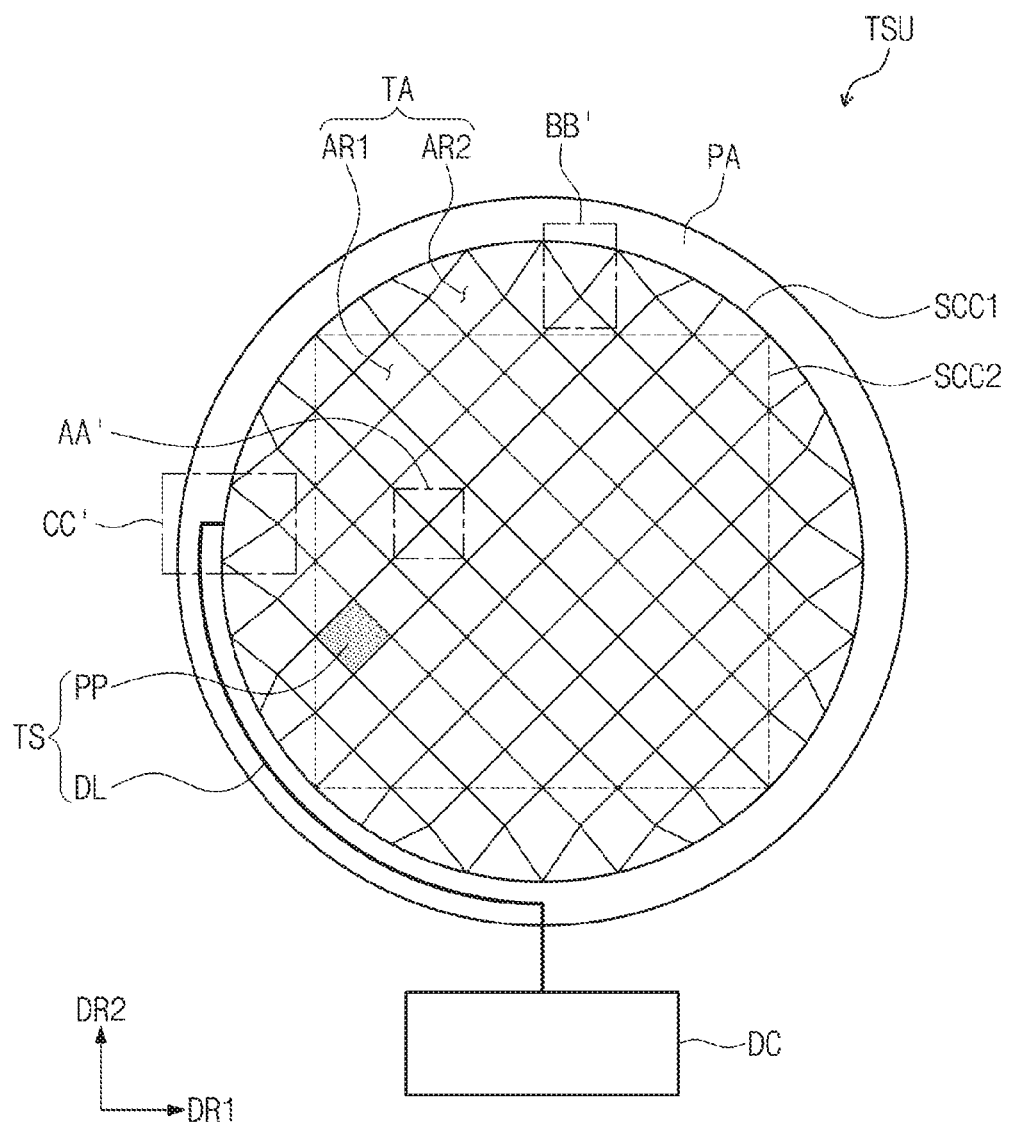
FIG. 2 is a plan view of the electronic device shown in FIG. 1 illustrating an exemplary touch sensing unit.

Referring to FIG. 2, the touch sensing unit TSU includes a base member BS, a touch sensor TS, and a driving circuit DC. The base member BS may be a base layer on which the touch sensor TS is disposed. The base member BS may define a shape of the touch sensing unit TSU.

The base member TS may have a circular shape. Accordingly, the peripheral area PA may have a ring (annular) shape defined by an inner line having a circular shape and an outer line having a circular shape. When the base member BS has an oval shape or a polygonal shape, the outer line of the peripheral area PA or the touch sensing unit TSU may have the oval shape or the polygonal shape, but it should not be limited thereto or thereby.

The touch sensor TS is disposed on the base member BS. The touch sensor TS may include a plurality of patterns PP and a driving line DL.

The patterns PP are disposed in the touch area TA. The patterns PP include a conductive material. A conductivity of the patterns PP may exert influence on a touch sensitivity of the touch sensor TS as is known in the art.

For the convenience of explanation, one pattern among the patterns PP shown in FIG. 2 is represented by a hatch, and spaces existing between the patterns PP are represented by solid lines.

The patterns PP may include a transparent material. In detail, the patterns PP may include a transparent conductive oxide. For instance, the patterns PP may include at least one of indium zinc gallium (IGZO), indium tin oxide (ITO), indium gallium oxide (IGO), indium zinc gallium oxide (IGZO), and mixture/compound thereof. Accordingly, components disposed under the touch sensor TS may be easily perceived by outside observers regardless of the touch sensor TS.

The patterns PP may include a plurality of mesh lines. For instance, the patterns PP may have a metal mesh structure. Thus, although the patterns PP include an opaque material, the touch sensor TS might not be perceived by outside observers. Alternatively, the touch sensor TS may include mesh lines disposed in an area defining the outer line of at least one pattern of the patterns PP. In another alternative, the touch sensor TS may include mesh lines defining the driving line DL.

The touch sensor TS may sense at least one of a position of the touch from the outside and an intensity (pressure) of the touch from the outside as is known in the art. The touch sensor TS may have various structures or may include various materials and should not be limited to a specific embodiment.

For the convenience of explanation, the first closed-loop SCC1 is represented by a solid line. The first closed-loop SCC1 may be defined by the simple closed curve in which at least the portion thereof is curved. For instance, the first closed-loop SCC1 may have a circular shape, an oval shape, a shape defined by one curved line and plural straight lines, a shape defined by one straight line and plural curved lines, or a shape defined by plural curved lines and plural straight lines.

The touch area TA may be surrounded by the first closed-loop SCC1. The touch area TA may have a shape determined depending on the shape of the first closed-loop SCC1. Accordingly, the first closed-loop SCC1 may be defined as the outer periphery of the touch area TA.

The first closed-loop SCC1 may be defined as a closed-loop having a circular shape, and the touch area TA may have various shapes surrounded by the first closed-loop SCC1 when viewed in a plan view. For example, the touch area TA may have a circle shape adjacent to the first closed-loop SCC1 or polygon shape circumscribed in the first closed-loop SCC1. However, the touch area TA may have various shapes in accordance with the shape of the first closed-loop SCC1 and should not be limited to a specific embodiment.

The touch area TA may include a first area AR1 and a second area AR2. The first area AR1 and the second area AR2 are distinguished from each other by a second closed-loop SCC2 defined in the touch area TA. The second closed-loop SCC2 is represented by a dotted line.

The first area AR1 is defined inside the second closed-loop SCC2. The first area AR1 is surrounded by the second closed-loop SCC2. The first area AR1 has a shape determined depending on the second closed-loop SCC2. Accordingly, the second closed-loop SCC2 may be defined as the outer periphery of the first area AR1.

The second area AR2 is defined outside the second closed-loop SCC2. The second area AR2 is disposed between by the second closed-loop SCC2 and the first closed-loop SCC1.

The second closed-loop SCC2 may be defined by a simple or complex closed contour including a plurality of straight lines. The second closed-loop SCC2 may have a polygonal shape defined by a plurality of sides and a plurality of vertices. In this case, each of the sides may be a straight line.

The vertices of the second closed-loop SCC2 may be overlapped with the first closed-loop SCC1. Accordingly, the first closed-loop SCC1 and the second closed-loop SCC2 may be connected to each other at the vertices of the second closed-loop SCC2.

The second closed-loop SCC2 may have a polygonal shape inscribed in the first closed-loop SCC1. Accordingly, the first closed contour SCC1 and the second closed-contour SCC2 may be in a point contact relationship through at least one vertex of the vertices. In FIG. 2, the first closed-loop SCC1 has the circular shape, and the second closed-loop SCC2 is a quadrangle inscribed in the circle, but they should not be limited thereto or thereby. For example the second closed-loop SCC2 may have a polygonal shape making line contact with the first closed-loop SCC1, but should not be limited to a specific embodiment.

The second area AR2 is disposed adjacent to the first area AR1. The second area AR2 may correspond to an area of the touch area TA except for the first area AR1. The second area AR2 may be an area surrounded by at least one side among the sides of the second closed-loop SCC2 and the first closed-loop SCC1. As shown, the second area AR2 may correspond to a plurality of segments surrounded by each of the four sides of the second closed-loop SCC2 and the first closed-loop SCC1. However, according to other embodiments, the second area AR2 may be defined as a single area, but should not be limited to a specific embodiment.

Figure 3A:
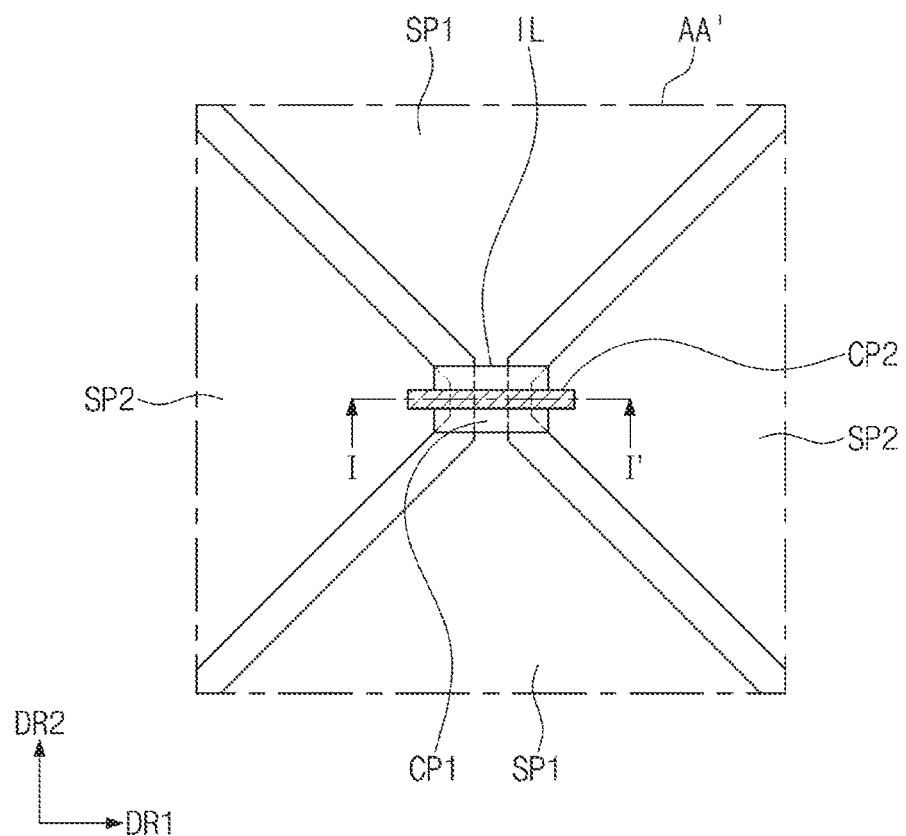
FIG. 3A is an enlarged plan view showing an area AA' of FIG. 2.
Figure 3B:
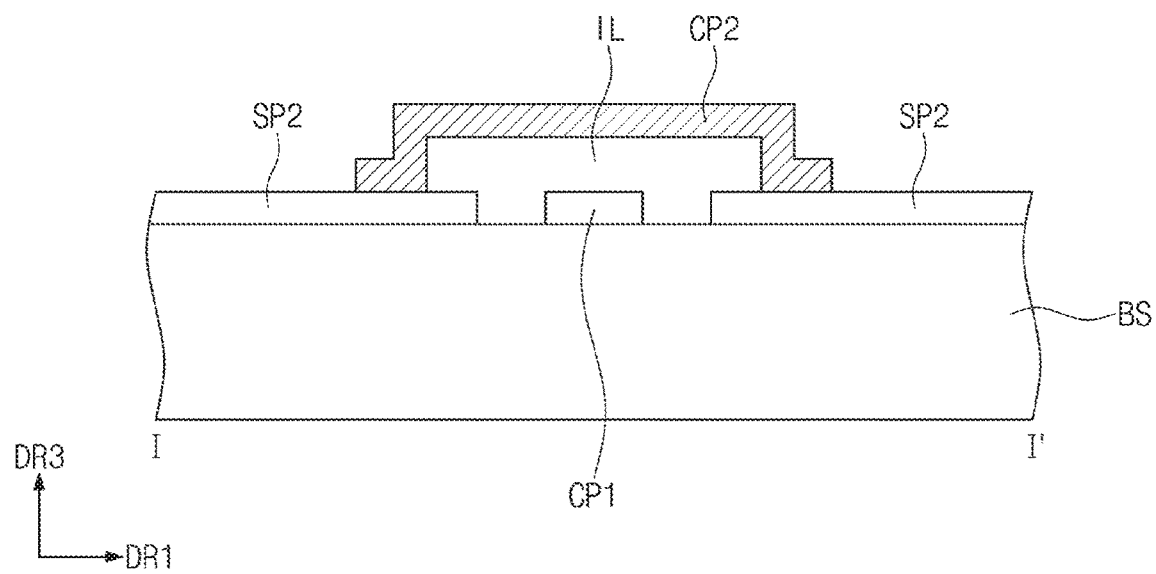
FIG. 3B is a cross-sectional view taken along line I-I' of FIG. 3A.

The area AA' shown in FIG. 2 indicates a portion of the first area AR1. Referring to FIGS. 3A and 3B, the patterns PP may include a plurality of first sensing patters SP1, a plurality of second sensing patters SP2, a plurality of first connection patterns CP1, and a plurality of second connection patterns CP2.

The first sensing patterns SP1 are arranged in a first direction DR1 and a second direction DR2 to be spaced apart from each other. Each of the first connection patterns CP1 extends in the second direction DR2. Each first connection pattern CP1 is disposed between the first sensing patterns SP1 arranged in the second direction DR2 to electrically connect the first sensing patterns SP1.

The second sensing patterns SP2 are arranged in the first direction DR1 and the second direction DR2 to be spaced apart from each other. The second sensing patterns SP2 are alternately arranged with the first sensing patterns SP1.

Each of the second connection patterns CP2 extends in the first direction DR1. The second connection pattern CP2 are insulated from the first connection patterns CP1 while crossing the first connection patterns CP1. Each of the second connection patterns CP2 is disposed between the second sensing patterns SP2 arranged in the first direction DR2 among the second sensing patterns SP2 to electrically connect the second sensing patterns SP2.

The first sensing patterns SP1, the second sensing patterns SP2, and the first connection patterns CP1 may be disposed on or in the same layer as each other. The second connection patterns CP2 are disposed spaced apart from the first connection patterns CP1 in an upper direction DR3 such that an insulating layer IL is disposed between the second connection patterns CP2 and the first connection patterns CP1.

The insulating layer IL may include a plurality of insulating patterns respectively covering the first connection patterns CP1. The second connection patterns CP2 are respectively disposed on the insulating patterns, and each of the second connection patterns CP2 makes contact with two second sensing patterns adjacent to each other.

Referring to FIG. 2 again, the driving line DL is disposed in the peripheral area PA. The driving line DL is connected to any one of the patterns PP to electrically connect the driving circuit DC and the touch area TA. The driving line DL applies an electrical signal provided from the driving circuit DC to the touch area TA or applies an external touch sensing signal occurring in the touch area TA to the driving circuit DC.

For the convenience of explanation, FIG. 2 shows one driving line DL, but other embodiments include more than one driving line DL. Each of the driving lines DL is connected to a corresponding pattern among patterns PP disposed adjacent to the first closed-loop SCC1 to activate the whole of the touch area TA.

The driving circuit DC may include at least one driving device. The driving device may generate the electrical signal to be applied to the touch area TA or process the electrical signal provided from the touch area. The driving devices may be connected to each other through conductive lines.

The driving circuit DC may be separately provided outside the base member BS. Accordingly, the driving circuit DC may be disposed on a base layer, such as a flexible substrate, and may be connected to the driving line DL through a separate wire.

Alternatively, the driving circuit DC may be mounted on the base member BS. Thus, the driving line DL may be directly connected to the driving circuit DC. Accordingly, the touch sensing unit TSU may be slimmed since the touch sensor TS and the driving circuit DC are mounted on the base member BS, but it should not be limited thereto or thereby. The driving circuit may have various configurations.

Figure 4A:
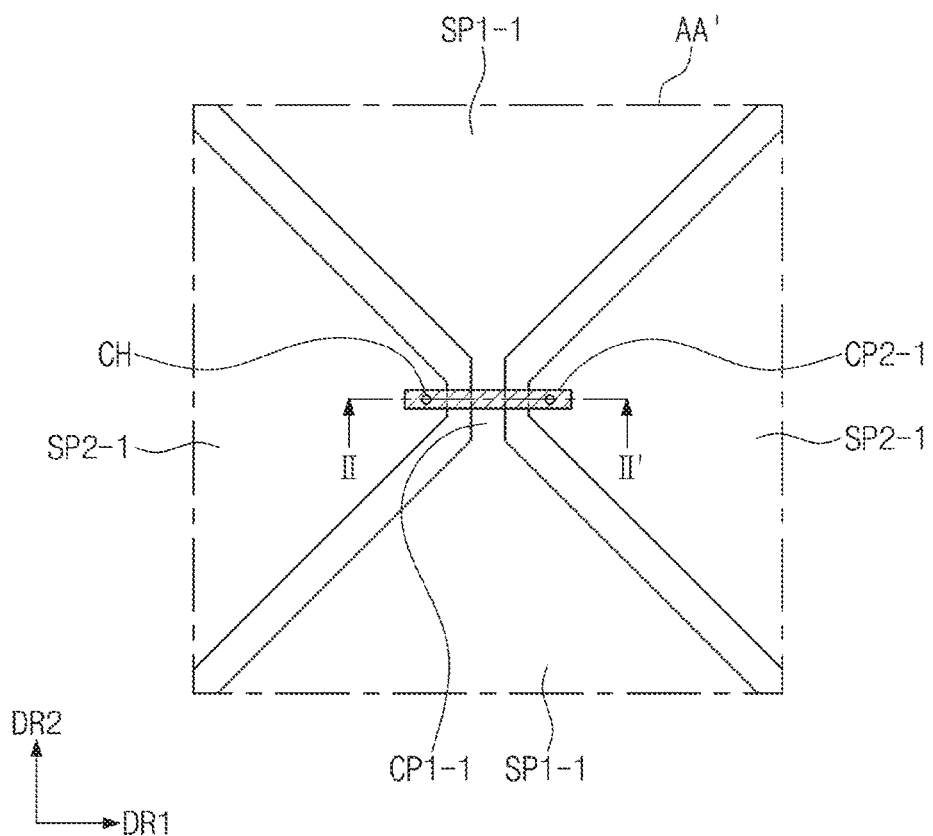
FIG. 4A is an enlarged plan view showing an alternative embodiment of area AA' of FIG. 2.
Figure 4B:
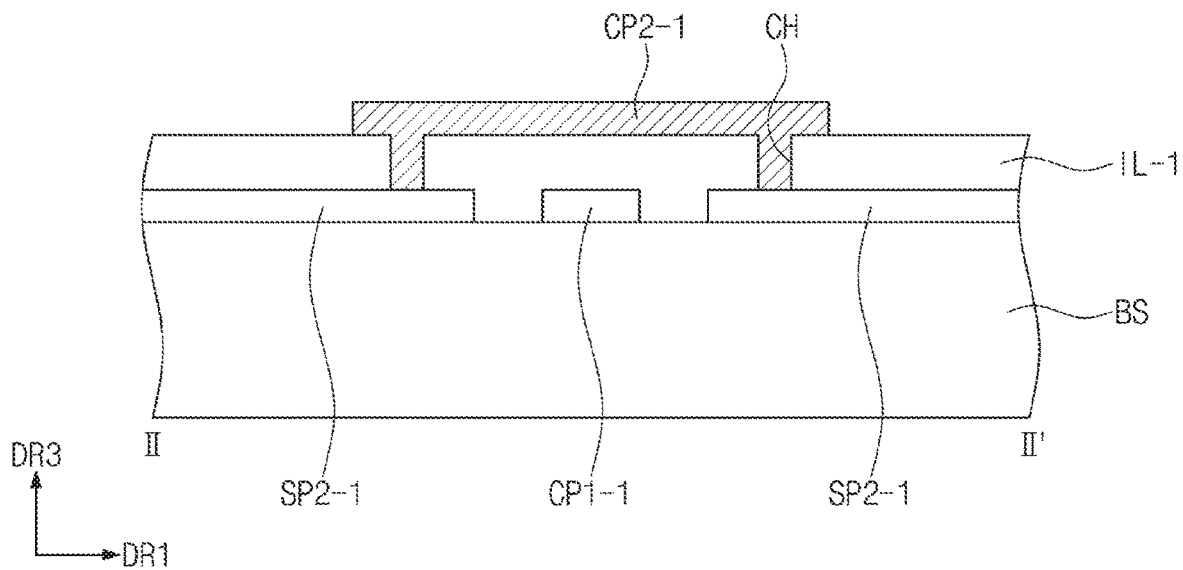
FIG. 4B is a cross-sectional view taken along line II-II' of FIG. 4A.
Figure 4C:
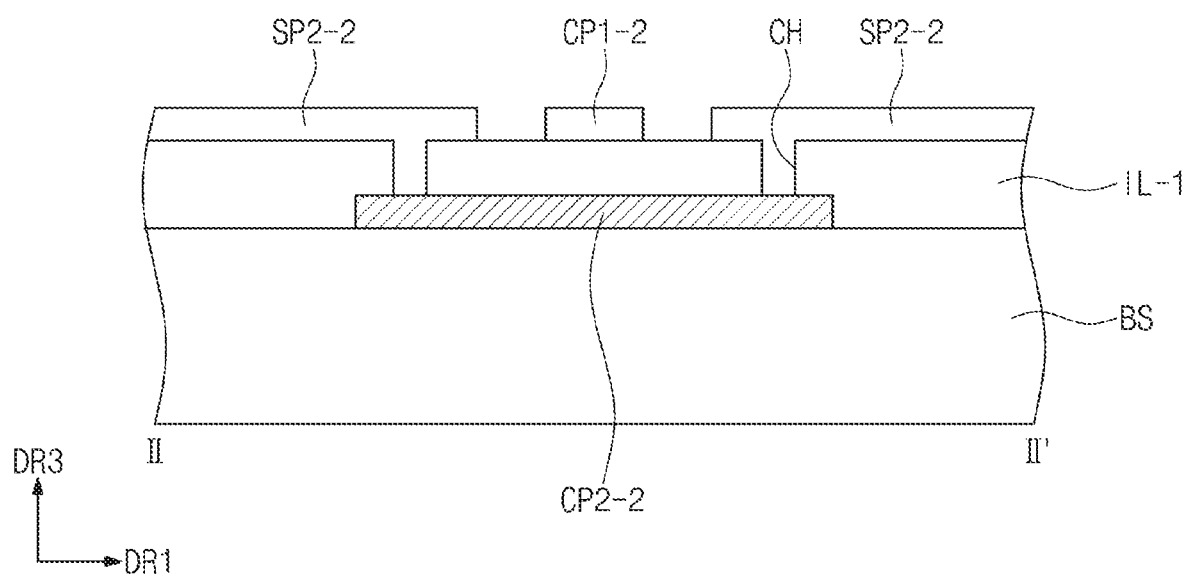
FIG. 4C is across-sectional view taken along line II-II' of FIG. 4A showing an alternative embodiment of area AA' of FIG. 2.

For the convenience of explanation, FIG. 4A shows an area corresponding to the area AA' shown in FIG. 2. FIG. 4C shows an area corresponding to that shown in FIG. 4B. Hereinafter, the electronic device will be described in detail with reference to FIGS. 4A to 4C. In FIGS. 4A to 4C, the same reference numerals denote the same elements in FIGS. 1 to 3C, and thus detailed descriptions of the same elements will be omitted.

Referring to FIGS. 4A and 4B, the patterns may include a plurality of first sensing patterns SP1-1, a plurality of second sensing patterns SP2-1, a plurality of first connection patterns CP1-1, and a plurality of second connection patterns CP2-1. The first sensing patterns SP1-1, the second sensing patterns SP2-1, and the first connection patterns CP1-1 may be disposed on the same layer as each other. The first sensing patterns SP1-1, the second sensing patterns SP2-1, and the first connection patterns CP1-1 may substantially correspond to the first sensing patterns SP1, the second sensing patterns SP2, and the first connection patterns CP1 shown in FIGS. 2 to 3B, respectively.

The second connection patterns CP2-1 are disposed spaced apart from the first connection patterns CP1-1 in an upper direction DR3 such that an insulating layer IL-1 is disposed between the second connection patterns CP2-1 and the first connection patterns CP1-1. In this case, the insulating layer IL-1 may be provided in a single layer to cover the first sensing patterns SP1-1, the second sensing patterns SP2-1, and the first connection patterns CP1-1.

Accordingly, the first sensing patterns SP1-1, the second sensing patterns SP2-1, and the first connection patterns CP1-1 may be disposed between the insulating layer IL-1 and the base member BS. The second connection patterns CP2-1 may be respectively connected to the second sensing patterns adjacent thereto through contact holes CH defined through the insulating layer IL-1.

As another example, referring to FIG. 4C, the second connection patterns CP2-2 may be disposed under the insulating layer IL-1. Thus, the first sensing patterns SP1-1, the second sensing patterns SP2-1, and the first connection patterns CP1-1 may be disposed on the insulating layer IL-1. The second sensing patterns SP2-2 may be adjacent to each other among the second sensing patterns SP2-2 such that the first connection patterns CP1-2 are disposed therebetween, and may be respectively connected to the second connection patterns CP2-2 through contact holes CH defined through the insulating layer IL-1. The touch sensor TS may have various structures and should not be limited to a specific embodiment.

Figure 5:
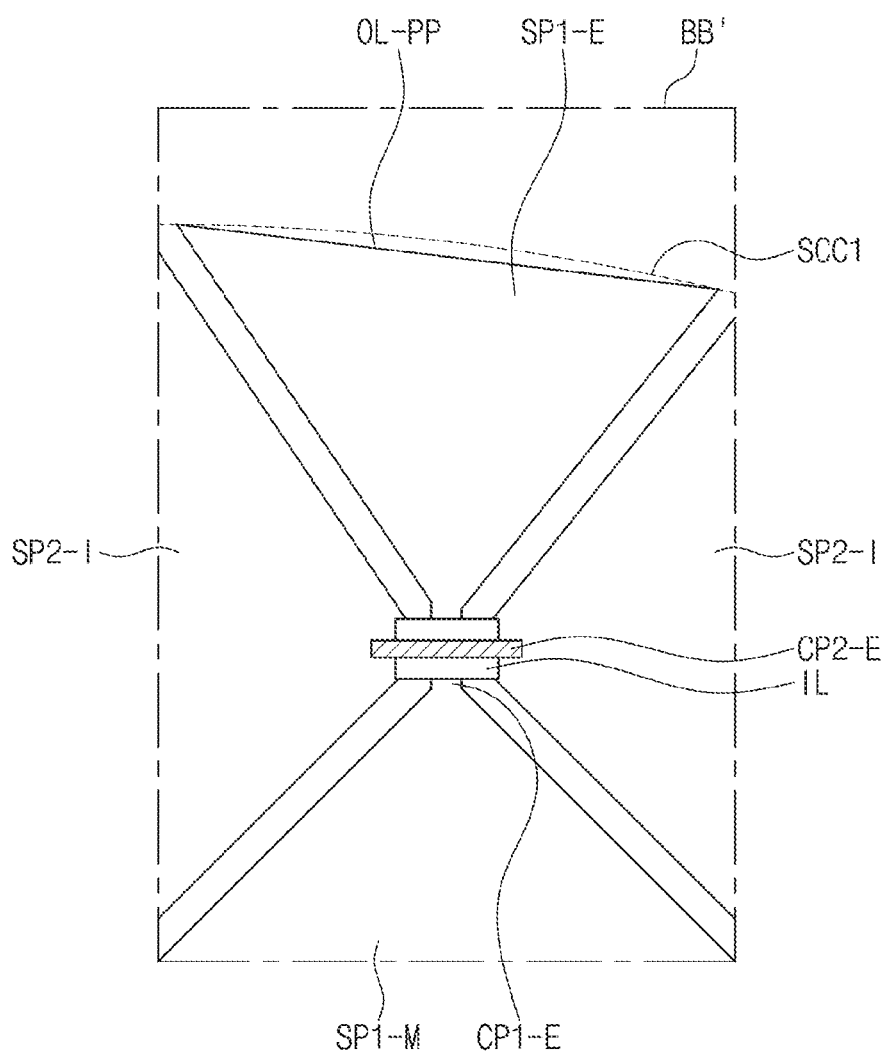
FIG. 5 is an enlarged plan view showing an area BB' of FIG. 2.

Referring to FIG. 5, the area BB' shows a portion of the second area AR2 of the touch area TA of the touch sensing unit TSU. Hereinafter, an edge area of the touch area TA will be described in detail with reference to FIG. 5. The edge area of the touch area TA may be an area adjacent to the first closed-loop SCC1. In FIG. 5, the same reference numerals denote the same elements in FIGS. 1 to 4C, and thus detailed descriptions of the same elements will be omitted.

Among the patterns PP, FIG. 5 shows a first edge sensing pattern SP1-E, a first edge connection pattern CP1-E, a plurality of intermediate patterns SP2-I, and a first overlap sensing pattern SP1-M. The first edge sensing pattern SP1-E, the intermediate patterns SP2-I, the first edge connection pattern CP1-E, and a second edge connection pattern CP2-E are disposed in the second area AR2. The first edge sensing pattern SP1-E, the intermediate patterns SP2-I, the first edge connection pattern CP1-E, and the second edge connection pattern CP2-E are not overlapped with the first area AR1.

The first overlap sensing pattern SP1-M is overlapped with each of the first area AR1 and the second area AR2. An outer line of the first area AR1 crosses the first overlap sensing pattern SP1-M. Accordingly, a portion of the first overlap sensing pattern SP1-M is disposed in the first area AR1, and the other portion of the first overlap sensing pattern SP1-M is disposed in the second area AR2. FIG. 5 shows only a portion, which is overlapped with the second area AR2, of the first overlap sensing pattern SP1-M.

The intermediate sensing patterns SP2-1 are disposed spaced apart from each other such that the first edge connection pattern CP1-E is disposed between the intermediate sensing patterns SP2-1. The intermediate sensing patterns SP2-1 are electrically insulated from the first overlap sensing pattern SP1-M. The intermediate sensing patterns SP2-1 may be electrically connected to each other through the second edge connection pattern CP2-E.

The first edge connection pattern CP1-E connects the first edge sensing pattern SP1-E and the first overlap sensing pattern SP1-M. The second edge connection pattern CP2-E connects the intermediate patterns SP2-I to each other. The first edge connection pattern CP1-E and the second edge connection pattern CP2-E may respectively correspond to the first connection pattern CP1 and the second connection pattern CP2 shown in FIG. 3A.

One side portion OL-PP of the first edge sensing pattern SP1-E faces the first closed-loop SCC1. The one side portion OL-PP of the first edge sensing pattern SP1-E includes a straight line or a curved line that is adjacent to the first closed-loop SCC1.

As the one side portion OL-PP of the first edge sensing pattern SP1-E is closer to the first closed-loop SCC1 in the same touch area TA, an area of the first edge sensing pattern SP1-E may increase. The one side portion OL-PP of the first edge sensing pattern SP1-E as shown is a straight line, but the one side portion OL-PP of the first edge sensing pattern SP1-E may be configured to include a straight line, a plurality of straight lines, or a curved line.

The area of the first edge sensing pattern SP1-E may be substantially equal to or greater than about a half (½) of an area of the first overlap sensing pattern SP1-M. An area of one pattern may mean an area of the one pattern when viewed in a plan view. The first edge sensing pattern SP1-E may have an area substantially equal to or greater than the area of the first overlap sensing pattern SP1-M in the second area AR2.

As an example, the touch occurring in the area BB' may be sensed by portions of the patterns occupying the area BB'. That is, the touch occurring in the area BB' may be sensed by a portion of the first overlap sensing pattern SP1-M, a portion of each of the intermediate patterns SP2-I, and the first edge sensing pattern SP1-E.

As depicted, one first overlap sensing pattern SP1-M may have the substantially same shape as that of one first sensing pattern SP1. Accordingly, the area of the first overlap sensing pattern SP1-M in the area BB' may be substantially equal to about a half of the first sensing pattern SP1.

Consequently, the first edge sensing pattern SP1-E may have the area substantially equal to or greater than the area of the first sensing pattern SP1 disposed in the first area AR1. The touch sensing unit TSU may provide a touch sensing area in the edge area of the touch area TA, which is greater than the touch sensing area in a center area of the touch area TA. Thus, the touch sensing unit TSU may provide substantially uniform touch sensitivity in the touch area defined by the imaginary outer line having the curved shape.

Since the area of the first edge sensing pattern SP1-E is substantially equal to or greater than about half (½) of the area of the first overlap sensing pattern SP1-M, the touch sensing unit TSU may provide the same touch sensing area as the area AA' shown in FIG. 3A.

As discussed above, the area of the pattern adjacent to the outer line having the curved shape of the touch area TA is substantially equal to or greater than the half (½) of the area of the pattern disposed in the center area, and thus the touch sensitivity of the area adjacent to the outer line may be improved by the touch sensitivity of the center area. Accordingly, the touch sensing unit TSU may provide the uniform touch sensitivity in the touch area TA defined by the outer line having the curved shape.

For the convenience of explanation, FIGS. 6A to 6F sequentially show the touch sensor TS of the touch sensing unit TSU shown in FIG. 2 according to areas. FIG. 7 shows the patterns disposed in an area adjacent to the first area AR1 and the second area AR2.

Hereinafter, the touch sensor TS will be described in detail with reference to FIGS. 6A to 6F and 7. In FIGS. 6A to 6F and 7, the same reference numerals denote the same elements in FIGS. 1 to 5, and thus detailed descriptions of the same elements will be omitted.

Figure 6A:
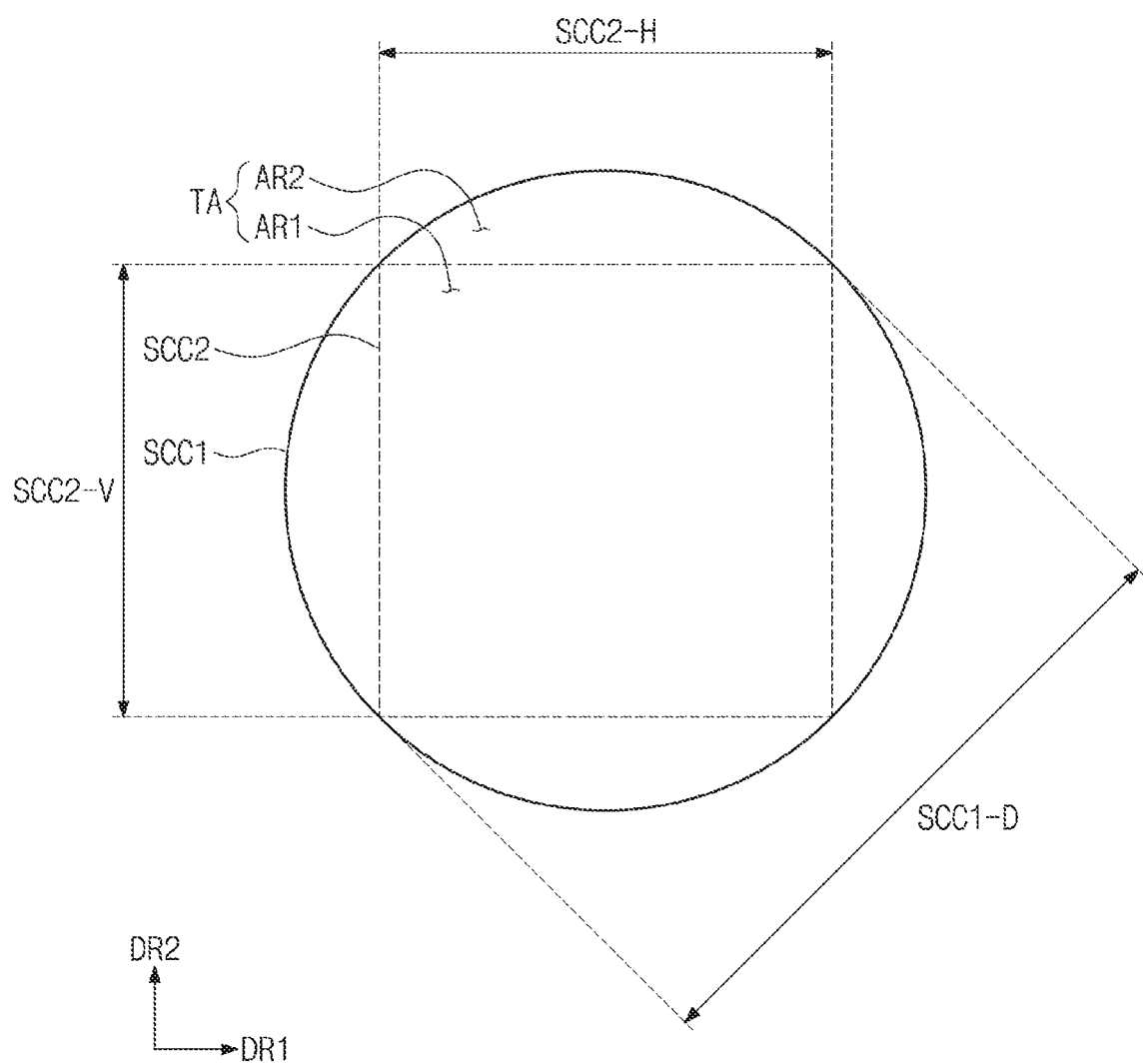
FIG. 6A, FIG. 6B, FIG. 6C, FIG. 6D, FIG. 6E and FIG. 6F are plan views showing a touch sensor constructed according to the principles of the invention.
Figure 7:
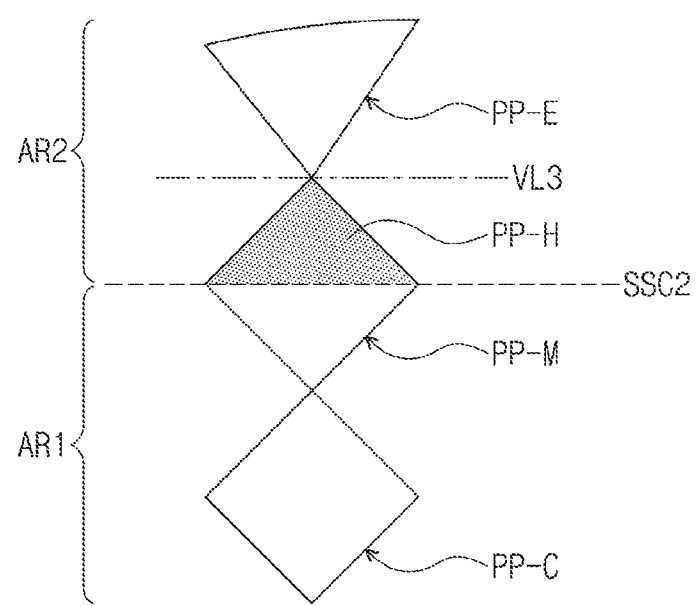
FIG. 7 is a plan view showing a portion of exemplary patterns adjacent to areas AR1 and AR2 of FIG. 6A.

FIG. 6A shows the touch area TA. The touch area TA is defined by the first closed-loop SCC1. The touch area TA may include the first area AR1 and the second area AR2 when viewed in a plan view. The first area AR1 and the second area AR2 are distinguished from each other by the second closed-loop SCC2. For the convenience of explanation, the first closed-loop SCC1 is represented by a solid line, and the second closed-loop SCC2 is represented by a dotted line.

The first closed-loop SCC1 is shown as a circle having a predetermined diameter SCC1-D. The area of the touch area TA may correspond to an area of the circle having the diameter SCC1-D.

The second closed-loop SCC2 is shown as a quadrangular shape defined by two horizontal sides SCC2-H extending in the first direction DR1 and two vertical sides SCC2-V extending in the second direction DR2. Accordingly, the area of the first area AR1 may corresponding to an area of the quadrangular shape defined by the two horizontal sides SCC2-H and the two vertical sides SCC2-V.

The second closed-loop SCC2 may be inscribed in the first closed-loop SCC1. Accordingly, each of four vertices of the second closed-loop SCC2 may make contact with the first closed-loop SCC1 at one contact point.

Each of the two horizontal sides SCC2-H and the two vertical sides SCC2-V of the second closed-loop SCC2 may be a chord of the circle of the first closed-loop SCC1. The second closed-loop SCC2 may divide the touch area TA into five areas.

The second area AR2 may be defined in an area of the touch area TA except for the first area AR1. The second area AR2 may include four areas each being surrounded by a corresponding side of the two horizontal sides SCC2-H and the two vertical sides SCC2-V and the first closed-loop SCC1. Each of the four areas may correspond to a segment separated by one side of the two horizontal sides SCC2-H and the two vertical sides SCC2-V.

The second closed-loop SCC2 may have a square shape. Accordingly, the two horizontal sides SCC2-H and the two vertical sides SCC2-V may have the same length as each other. The diameter SCC1-D of the first closed-loop SCC1 may correspond to a diagonal line of the second closed-loop SCC2.

Figure 6B:
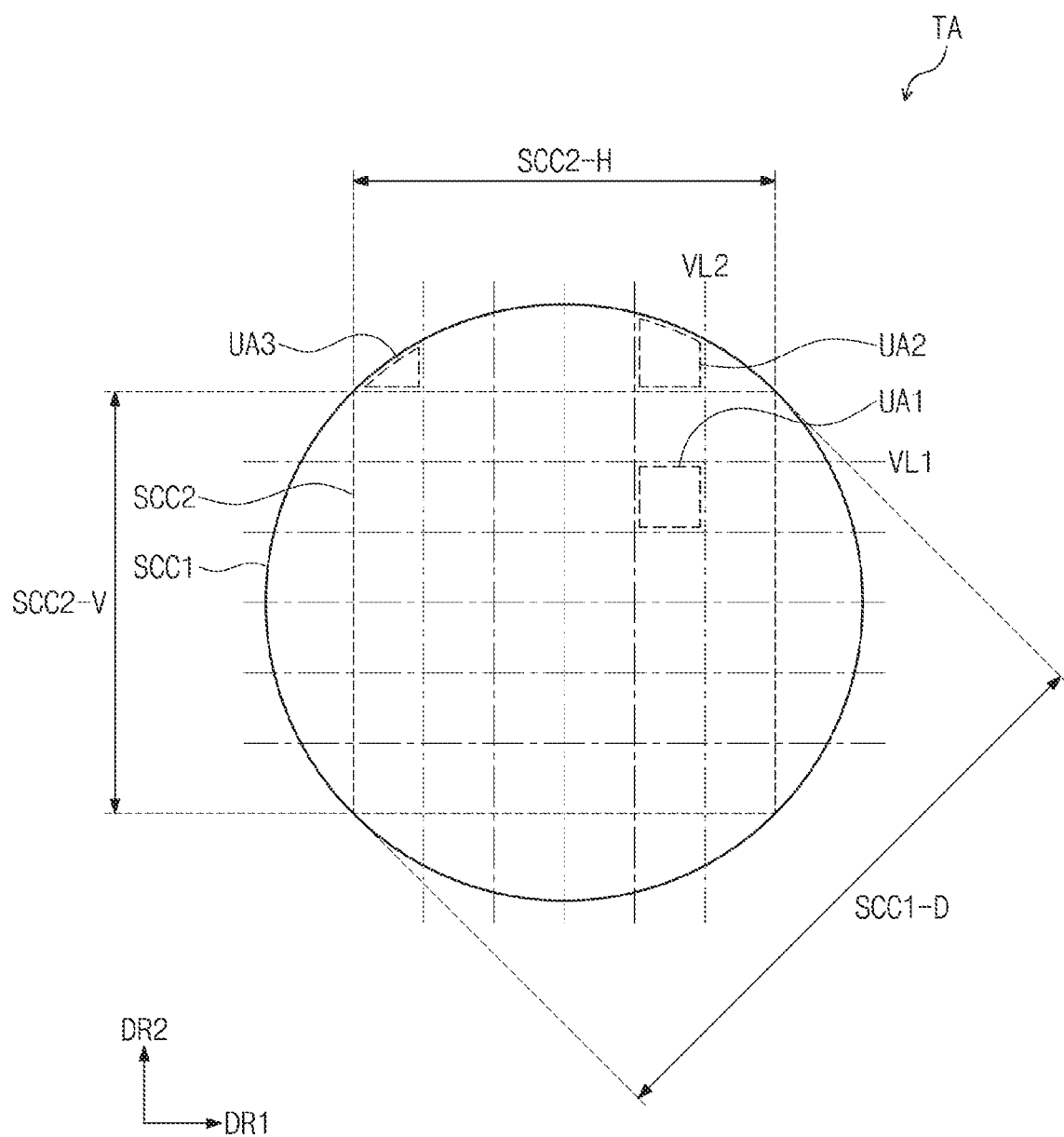

Then, as shown in FIG. 6B, predetermined imaginary lines may be defined in the touch area TA. The imaginary lines may include a plurality of first imaginary lines VL1 and a plurality of second imaginary lines VL2. The first imaginary lines VL1 extend in the first direction DR1, and the second imaginary lines VL2 extend in the second direction DR2.

As shown, the number of the first imaginary lines VL1 may be substantially equal to the number of the second imaginary lines VL2, but the number of the first imaginary lines VL1 and the number of the second imaginary lines VL2 may be independently determined.

The first and second imaginary lines VL1 and VL2 may divide the first and second areas AR1 and AR2 into plural areas. For instance, the first and second imaginary lines VL1 and VL2 may divide the first area AR1 into a plurality of first unit areas UA1 arranged in a matrix form defined by the first and second directions DR1 and DR2.

The first unit area UA1 and a second unit area UA2 may be reference areas used to sense the touch. The touch sensitivity of the touch sensing unit may be changed depending on areas of the patterns with respect to each of the first unit area UA1 and the second unit area UA2 and an arrangement of the patterns.

As shown, each of the first unit areas UA1 may have a square shape, but the shape of the first unit areas UA1 should not be limited to a square shape. For example each of the first unit areas UA1 may have a rectangular shape. The shape of each of the first unit areas UA1 may be determined depending on a distance between the first imaginary lines VL1, a distance between the second imaginary lines VL2, and a distribution density of the first and second imaginary lines VL1 and VL2 in the first area AR1.

In addition, the first imaginary lines VL1 and the second imaginary lines VL2 may divide the second area AR2 into a plurality of second unit areas UA2 arranged in the first direction DR1 or the second direction DR2. Two areas facing in the second direction DR2 of the second area AR2 are defined as the second unit areas UA2 arranged in the first direction DR1 by the first imaginary lines VL1. In addition, two areas facing in the first direction DR1 of the second area AR2 are defined as the second unit areas UA2 arranged in the second direction DR2 by the second imaginary lines VL2.

The second area AR2 may further include a plurality of third unit areas UA3. Among the third unit areas UA3, two of the third unit areas UA3 are spaced apart from each other in the first direction DR1 or in the second direction DR2.

Among the third unit areas UA3, a different two of the third unit areas UA3 may be connected to each other through one vertex of vertices of the second closed-loop SCC2. The different two of the third unit areas UA3 may be arranged adjacent to each other in a direction in which the diameter SCC1-D of the first closed-loop SCC1 extends or in a direction crossing the direction in which the diameter SCC1-D of the first closed-loop SCC1 extends.

Each of the third unit areas UA3 may be an area defined by a portion of the second closed-loop SCC2, the first imaginary line VL1, and a portion of the first closed curved line SCC1 or an area defined by a portion of the second closed-loop SCC2, the second imaginary line VL2, and a portion of the first closed curved line SCC1. However, in other embodiments, the touch sensing unit may be configured to include only the first unit areas and the second unit areas, and the third unit areas may be omitted.

Figure 6C:
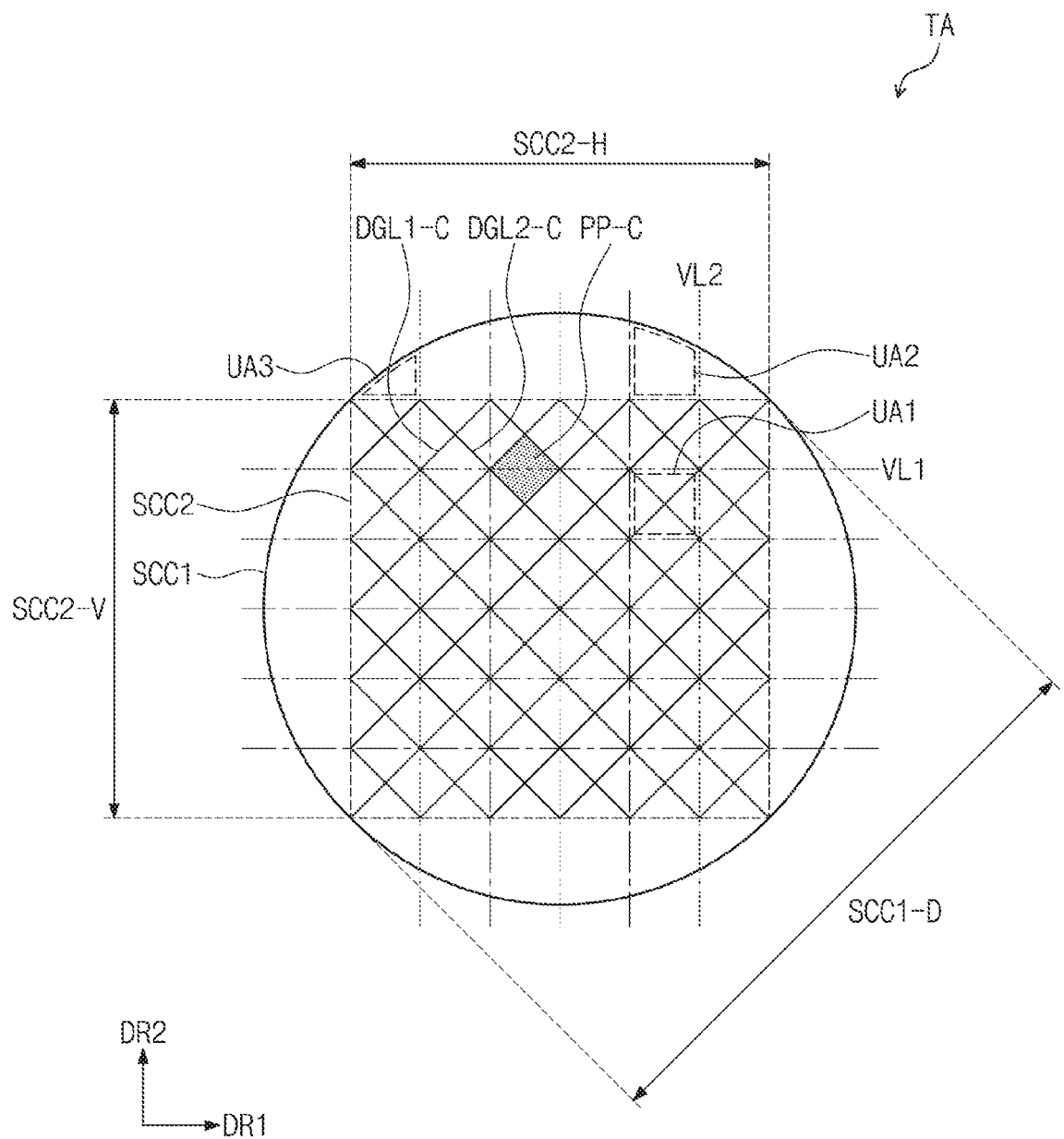

Referring to FIG. 6C, center patterns PP-C are defined by diagonal lines DGL1-C and DGL2-C of each of the first unit areas UA1. The diagonal lines DGL1-C and DGL2-C defined in each of the first unit areas UA1 may be boundaries between the center patterns PP-C.

The diagonal lines DGL1-C and DGL2-C include first center diagonal lines DGL1-C and second center diagonal lines DGL2-C crossing the first center diagonal lines DGL1-C. Each of the center patterns PP-C has a shape defined by the first center diagonal lines DGL1-C and the second center diagonal lines DGL2-C.

The first imaginary lines VL1 and the second imaginary lines VL2 defining the first unit areas UA1 may be diagonal lines of the center patterns PP-C. Accordingly, portions corresponding to about half of each of four center patterns PP-C may be disposed in one first unit area UA1. The portions overlapped with the one first unit area UA1 of the four center patterns PP-C may have substantially the same area as each other.

Figure 6D:
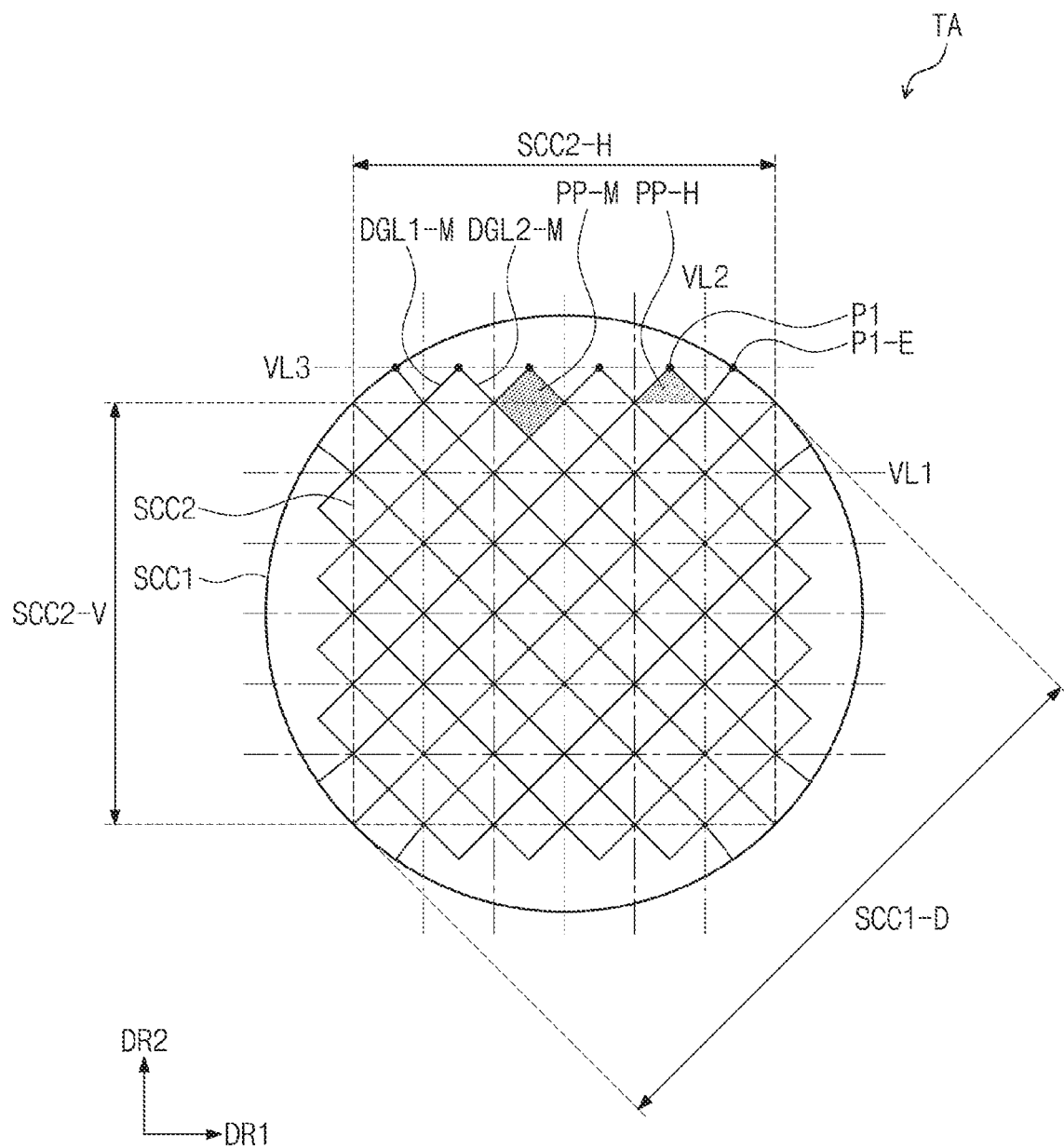

Then, as shown in FIG. 6D, overlap patterns PP-M of the patterns may be defined by diagonal lines DGL1-M and DGL2-M defined in a second area AR2-1. The overlap patterns PP-M are overlapped with each of the first area AR1 and the second area AR2.

The diagonal lines DGL1-M and DGL2-M include first overlap diagonal lines DGL1-M and second overlap diagonal lines DGL2-M crossing the first overlap diagonal lines DGL1-M.

Imaginary lines may further include a plurality of third imaginary lines VL3 defined in the second area AR2 to cross the second area AR2. One of the third imaginary lines VL3 may cross a portion adjacent to one side of the first area AR1 in the second area AR2 along the first direction DR1 or the second direction DR2.

Each of the first and second overlap diagonal lines DGL1-M and DGL2-M connects one point of the first closed-loop SCC1 and one point of a corresponding third imaginary line VL3. First points P1, at which the first overlap diagonal lines DGL1-M cross the second overlap diagonal lines DGL2-M to define the overlap patterns PP-M, may be defined at each of the third imaginary lines VL3. The overlap patterns PP-M may have the same shape as the center patterns PP-C.

A minimum distance between one third imaginary line and one first imaginary line or between one third imaginary line and one second imaginary line may be substantially equal to a distance between the first imaginary lines VL1 or a half of a distance between the second imaginary lines VL2. Among the overlap patterns PP-M, a portion PP-H of the overlap pattern disposed in the second area AR2 may be linearly symmetrical with a portion of the overlap pattern disposed in the first area AR1 among the overlap patterns PP-M with respect to an outer line of the first area AR1.

Meanwhile, edge points P1-E defined by the third imaginary line VL3 and the outer line of the touch area TA overlapped with the third imaginary line VL3 may be defined at the first closed-loop SCC1. The first and second overlap diagonal lines DGL1-M and DGL2-M connect the center patterns PP-C of the first area AR1 to the first points P1 and the edge pointes P1-E to define outer lines of the overlap patterns PP-M.

Figure 6E:
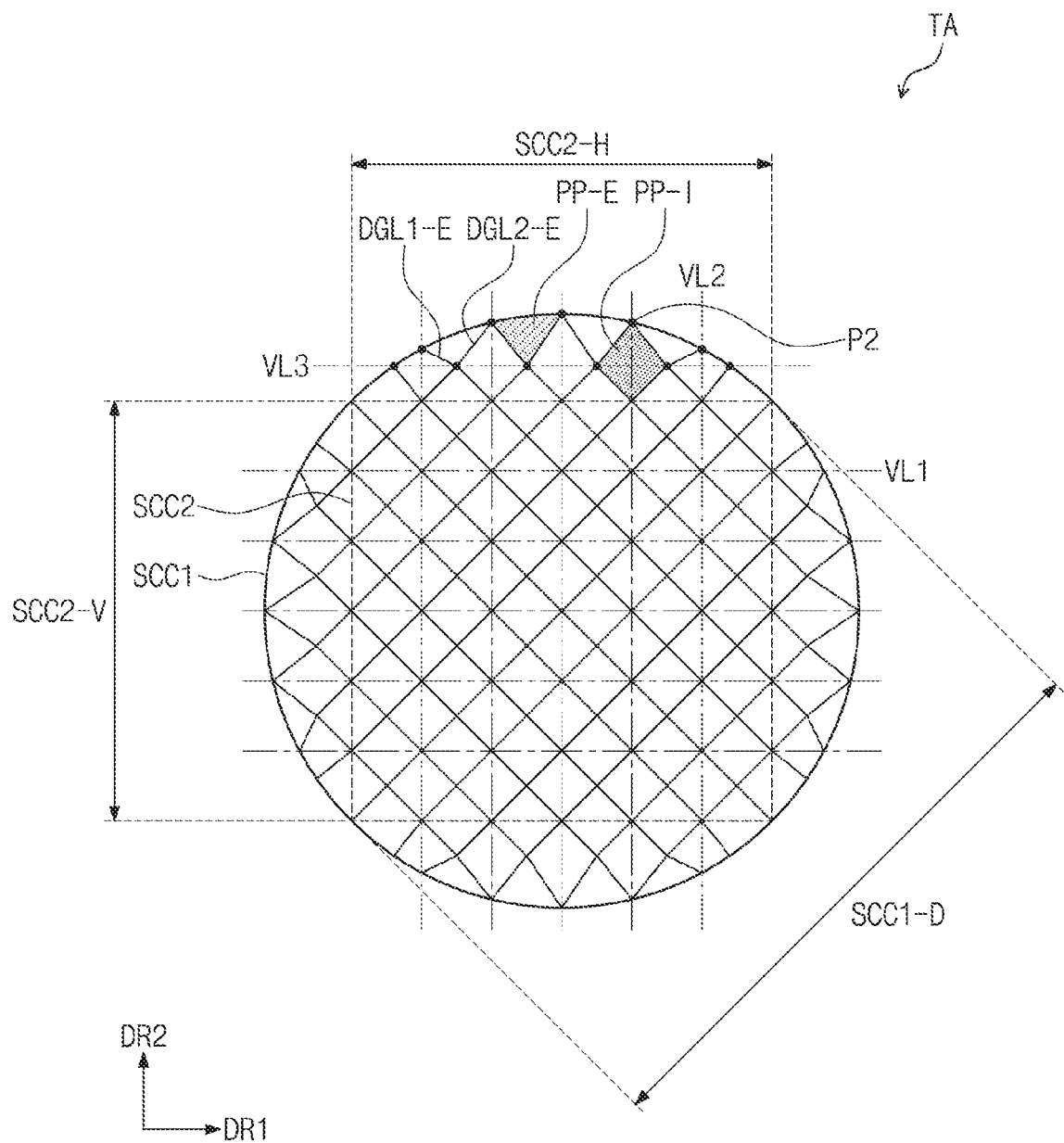

Referring to FIG. 6E, diagonal lines DGL1-E and DGL2-E respectively extending from the first points P1 and the edge points P1-E may be overlapped with the outer line of the touch area TA at second points P2. The diagonal lines DGL1-E and DGL2-E include first edge diagonal lines DGL1-E and second edge diagonal lines DGL2-E crossing the first edge diagonal lines DGL1-E. The diagonal lines DGL1-M and DGL2-M shown in FIG. 6D, the diagonal lines DGL1-E and DGL1-E shown in FIG. 6E, and the outer line of the touch area TA are connected to each other to define outer lines of the edge patterns PP-E. However, if the area of each of the edge pattern PP-E may be substantially equal to about half (½) of the area of each of the overlap patterns PP-M, the second points P2 may be defined as another way and should not be limited to a specific embodiment.

The first and second edge diagonal lines DGL1-E and DGL2-E may extend in different directions from those of the first and second overlap diagonal lines DGL1-M and DGL2-M. In addition, the first and second edge diagonal lines DGL1-E and DGL2-E may extend in different directions from those of the first and second center diagonal lines DGL1-C and DGL2-C.

Accordingly, the edge patterns PP-E may have a different shape from those of the center patterns PP-C and the overlap patterns PP-M. The touch sensing unit TSU controls the extension direction of the first and second edge diagonal lines DGL1-E and DGL2-E to control the shape and the area of the edge patterns PP-E.

The first and second edge diagonal lines DGL1-E and DGL2-E are connected to each other to define shapes of plural intermediate patterns PP-I. The intermediate patterns PP-I are disposed in the second area AR2 and arranged along the third imaginary lines VL3.

Each of the third imaginary lines VL3 may be parallel and overlapped with one diagonal line of each of the intermediate patterns PP-I. Each of the intermediate patterns PP-I may have an asymmetrical shape with respect to corresponding to the each of the intermediate patterns PP-I of the third imaginary lines VL3.

The intermediate patterns PP-I may be electrically insulated from the edge patterns PP-E adjacent thereto and the overlap patterns PP-M adjacent thereto. Each of the intermediate patterns PP-I is electrically connected to one of the center patterns PP-C. Each of the intermediate patterns PP-I may have an area substantially equal to or greater than about half (½) of the area of each of the center patterns PP-C.

Figure 6F:
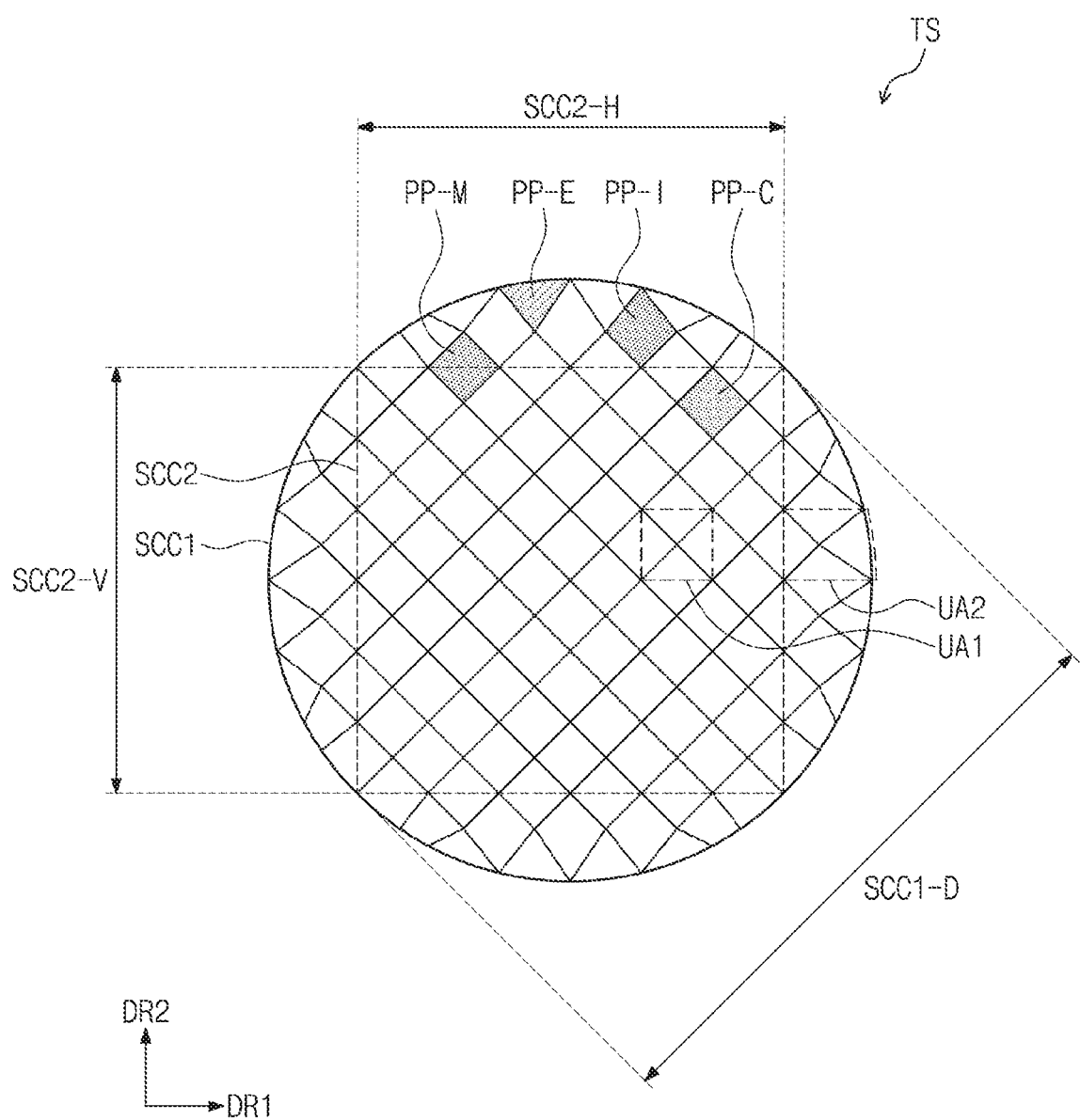

Referring to FIG. 6F, for the convenience of explanation, the driving line DL (refer to FIG. 2) is omitted. FIG. 6F shows one first unit area UA1 and one second unit area UA2.

As shown in FIG. 6F, the first unit area UA1 is overlapped with portions of four center patterns PP-C disposed in the first area AR1 among the patterns. The first unit area UA1 may correspond to the area AA' shown in FIG. 2.

In detail, the first unit area UA1 may be overlapped with the portions respectively corresponding to halves of the four center patterns PP-C. Areas of the four center patterns PP-C in the first unit area UA1 may be the same as each other. Accordingly, the touch occurring in the first unit area UA1 may be easily sensed by the four center patterns PP-C.

The second unit area UA2 is overlapped with the edge patterns PP-E, the overlap patterns PP-M, and the intermediate patterns PP-I, which are disposed in the second area AR2. The second unit area UA2 may correspond to the area BB' shown in FIG. 2.

In detail, the second unit area UA2 may be overlapped with a half of one overlap pattern, a half of each of two edge patterns adjacent to the overlap pattern and facing each other, and one edge pattern facing the overlap pattern. An area of the overlap pattern PP-M in the second unit area UA2 may be substantially equal to or greater than an area of the edge pattern PP-E connected to the overlap pattern PP-M in the second unit area UA2.

FIG. 7 shows one center pattern PP-C, one overlap pattern PP-M, and one edge pattern PP-E, which are connected to each other, as an example. As shown in FIG. 7, the second closed-loop SCC2 is overlapped with the overlap pattern PP-M.

The second closed-loop SCC2 may be substantially parallel to one diagonal line of the overlap pattern PP-M. The overlap pattern PP-M may have a shape linearly symmetrical with respect to the second closed-loop SCC2. Accordingly, the portion PP-H of the overlap pattern PP-M may have the area corresponding to about one half (½) of the area of the overlap pattern PP-M.

The edge pattern PP-E may have the area substantially equal to or greater than the portion PP-H of the overlap pattern PP-M connected to the edge pattern PP-E. That is, although the edge pattern PP-E has the outer line with the curved line, the edge pattern PP-E may have the area substantially equal to or greater than the area corresponding to about half of the overlap pattern PP-C. Thus, the edge pattern PP-E may provide an area substantially equal to or greater than the area of one pattern per unit area in the center area AR1. The touch sensor TS may thus have the uniform touch sensitivity in the whole area of the touch area TA including the curved line.

Figure 8A:
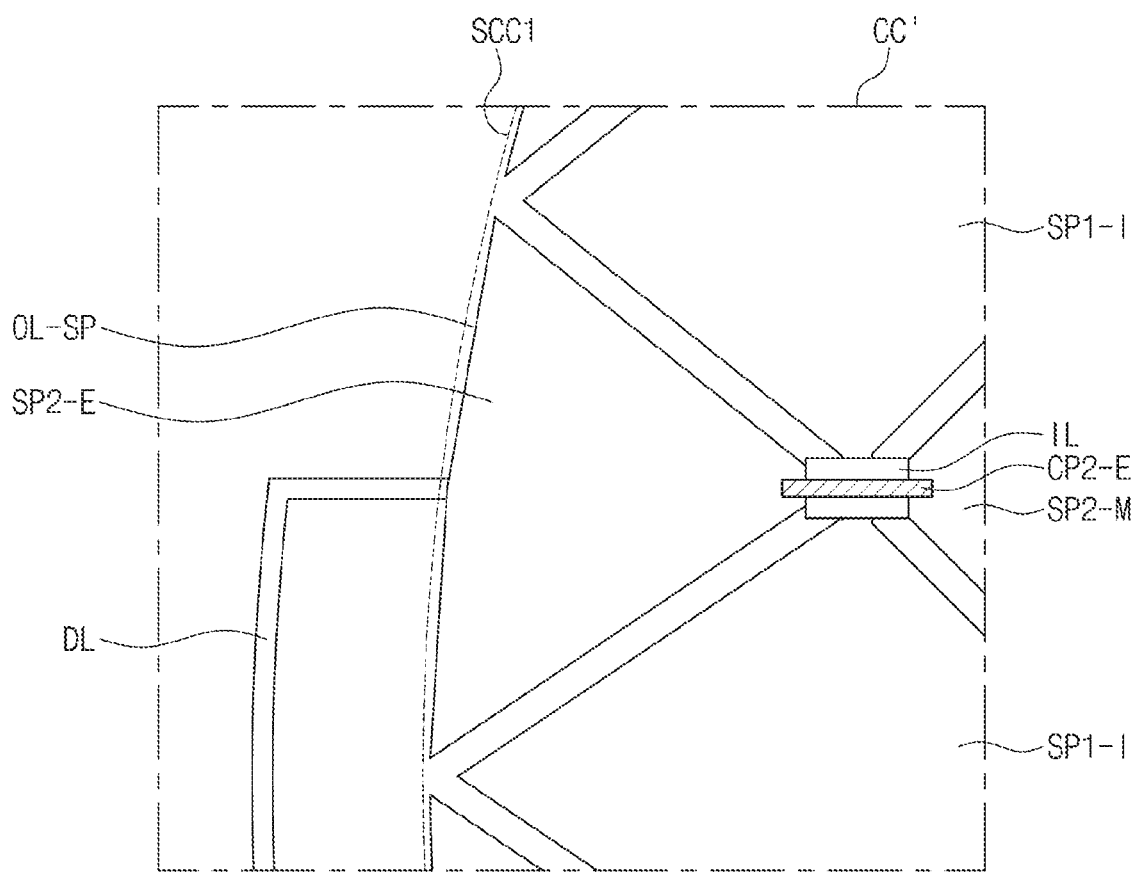
FIG. 8A is an enlarged plan view showing an area CC' of FIG. 2.
Figure 8B:
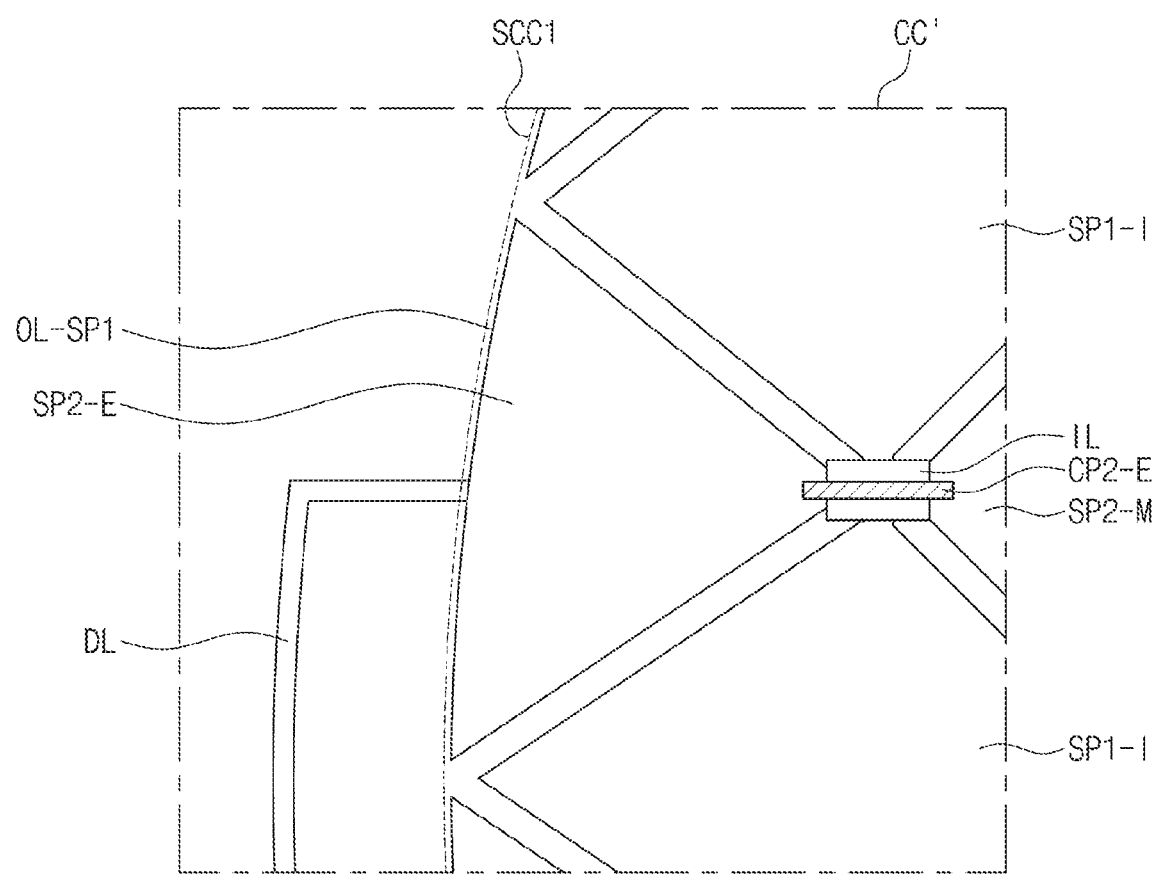
FIG. 8B is an enlarged plan view showing another embodiment of area CC' of FIG. 2.
Figure 8C:
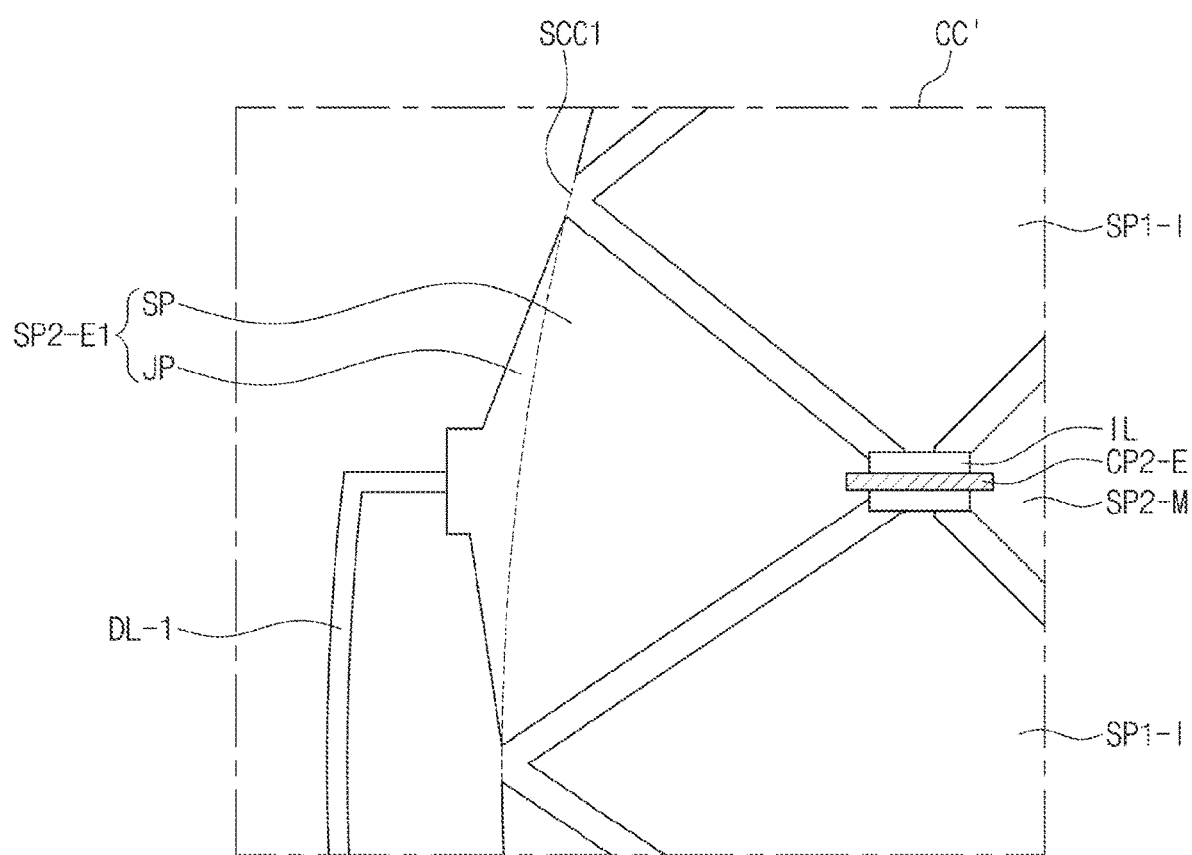
FIG. 8C is an enlarged plan view showing yet another embodiment of area CC' of FIG. 2.

Hereinafter, the touch sensor will be described with reference to FIGS. 8A to 8C. For the convenience of explanation, FIGS. 8B and 8C show areas corresponding to the area shown in FIG. 8A. In FIGS. 8A to 8B, the same reference numerals denote the same elements in FIGS. 1 to 7, and thus detailed descriptions of the same elements will be omitted.

Referring to FIGS. 8A to 8C, the driving line DL may be connected to one edge pattern SP2-E or SP2-E1. The edge pattern SP2-E is shown as the second edge sensing pattern.

The edge pattern SP2-E or SP2-E1 may be corresponding to the edge pattern PP-E in FIG. 7.

Alternatively, the driving line DL may be connected to various patterns among the patterns arranged along the outer line of the touch area TA. In addition, for the convenience of explanation, FIGS. 8A to 8C show one driving line DL, but the number of the driving line DL should not necessarily be limited to one. That is, the driving line DL may be provided in a plural number, and the driving lines may be connected to different patterns.

The driving line DL may extend along the first closed-loop SCC1. Accordingly, the driving line DL may be disposed to be adjacent to the touch area TA and to surround at least a portion of the touch area TA.

The edge pattern PP-E includes one side portion disposed at an outermost position of the touch area TA to face the first closed-loop SCC1. The edge pattern SP2-E may have various shapes as long as the edge pattern SP2-E has an area substantially equal to or greater than an area of a second overlap pattern SP2-M.

For instance, as shown in FIG. 8A, one side portion OL-SP of the edge pattern SP2-E may be defined by a plurality of straight lines connected to each other. A boundary of the active area from which the touch is substantially sensed may be determined by the one side portion OL-SP of the edge pattern SP2-E. When compared to the first edge pattern SP1-E having the one side portion defined by the single straight line as in FIG. 5, the active area for the touch may be implemented to have the curved shape since the one side portion of the edge pattern SP2-E includes the straight lines, and thus the area of the touch sensing area may increase.

As another example, referring to FIG. 8B, one side portion of the edge pattern SP2-E may have a curved shape along the first closed-loop SCC1. Accordingly, a curve-shaped touch sensing area may be implemented, and the touch sensing area may be increased.

As another example, referring to FIG. 8C, at least a portion of an edge pattern SP2-E1 is disposed outside the touch area TA and overlapped with the peripheral area PA. The edge pattern PP-E1 to which a driving line DL-1 is connected has a shape deformed from the edge pattern PP-E shown in FIG. 8A. For instance, the edge pattern SP2-E1 may be divided into a sensing portion SP and a joining portion JP.

The sensing portion SP may be a portion of the edge pattern SP2-E1, which is disposed in and overlapped with the touch area TA. The sensing portion SP may have a shape substantially corresponding to that of the edge pattern SP2-E shown in FIG. 8A. The external touch sensed by the edge pattern SP2-E1 may be sensed by the sensing portion SP.

The joining portion JP protrudes outwardly from the first closed-loop SCC1 of the touch area TA from the sensing portion SP. Accordingly, the joining portion JP is overlapped with the peripheral area PA. The driving line DL-1 may be connected to the joining portion JP of the edge pattern PP-E1.

As described above, since the edge pattern SP2-E1 further includes the joining portion JP, the driving line DL-1 connected to the edge pattern SP2-E1 may be prevented from exerting influence on sensing characteristics of the edge pattern SP2-E1. The driving line DL-1 is connected to an area of the edge pattern SP2-E1 except that the sensing portion SP used to sense the touch, and thus the driving line DL-1 and the edge pattern SP2-E1 may be stably connected to each other while a predetermined area used to sense the touch is obtained. Accordingly, the touch sensor may provide the uniform touch sensitivity even in the area to which the driving line DL-1 is connected.

Figure 9:
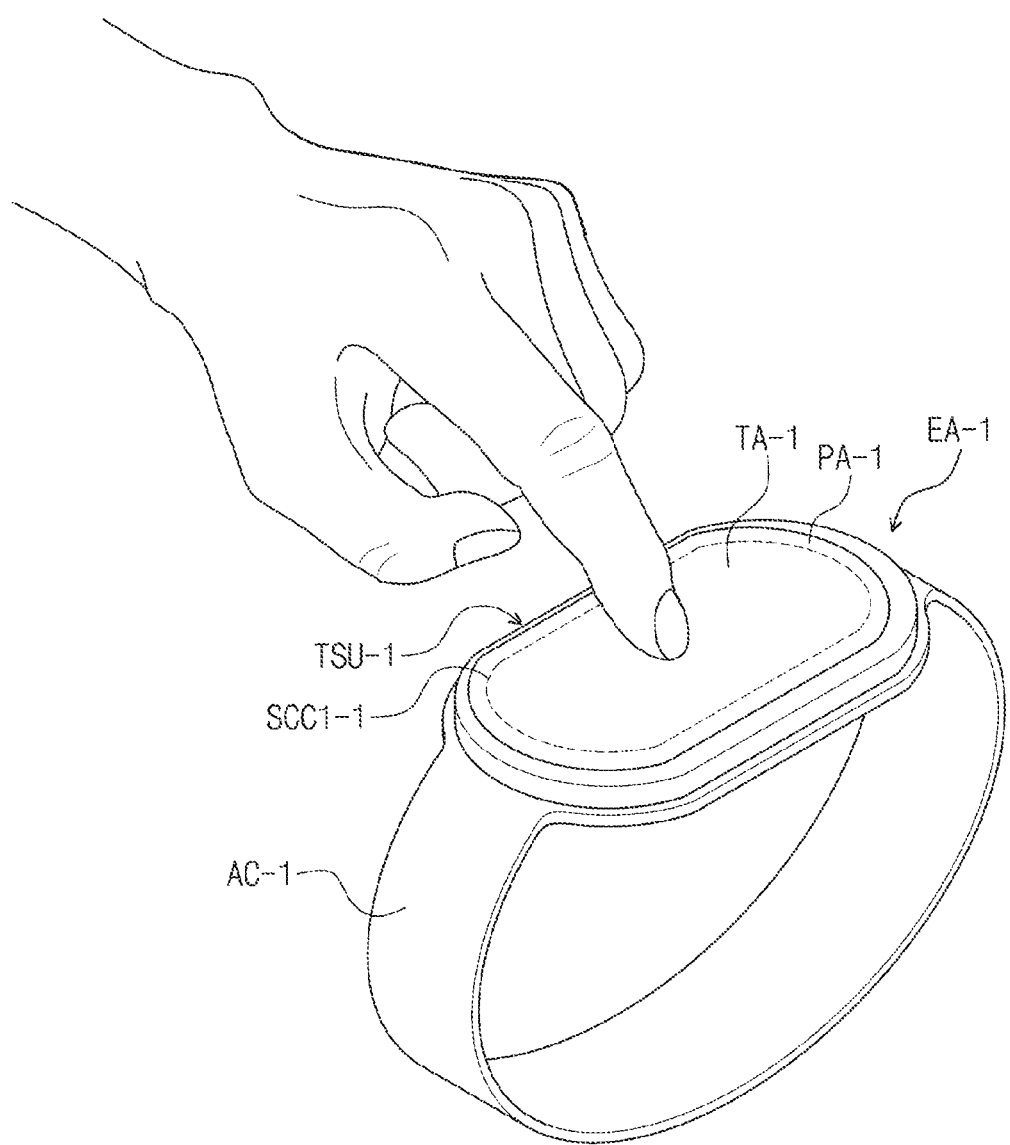
FIG. 9 is a perspective view showing another exemplary electronic device constructed according to the principles of the invention in a state of use.

Hereinafter, the electronic device EA-1 will be described in detail with reference to FIG. 9. In FIG. 9, the same reference numerals denote the same elements in FIGS. 1 to 8B, and thus detailed descriptions of the same elements will be omitted.

Referring to FIG. 9, the electronic device EA-1 may include a touch sensing unit TSU-1 having a different shape from that of the touch sensing unit TSU shown in FIG. 1. The touch sensing unit TSU-1 may have a shape defined by straight lines and curved side lines when viewed in a plan view. The touch sensing unit TSU-1 may have a shape elongated in one direction.

The touch sensing unit TSU-1 may include a touch area TA and a peripheral area PA distinguished from the touch area TA with respect to a first closed-loop SCC1-1 that is a simple or complex closed contour. The touch area TA may be defined inside the first closed-loop SCC1-1, and the peripheral area PA may be defined outside the first closed-loop SCC1-1.

The first closed-loop SCC1-1 may be a simple or complex closed contour configured to include a straight line and a curved line. The first closed-loop SCC1-1 includes two straight lines facing each other and two curved lines facing each other and has an oval shape in which a length in one direction is longer than a length in the other direction. The shape of the touch sensing unit TSU-1 according to the exemplary embodiment may have the longer length in the one direction parallel to a direction in which an additional unit AC-1 extends. Accordingly, the electronic device having a slim shape in the one direction may be easily implemented.

According to other embodiments, the touch sensing unit TSU-1 may have various shapes. In addition, the touch sensing unit TSU-1 may have various shapes, e.g., a shape different from the touch area, a shape defined by only straight side lines, etc., in the case that at least the one side portion of the touch area has the curved shape.

For the convenience of explanation, FIGS. 10A to 10F sequentially show the touch sensor TS-1 of the touch sensing unit TSU-1 shown in FIG. 9 according to areas. Hereinafter, the touch sensor TS-1 will be described in detail with reference to FIGS. 10A to 10F.

Referring to FIG. 10A, a touch area TA-1 includes a first area AR1-1 and a second area AR2-1. The first area AR1-1 and the second area AR2-1 may be distinguished from each other by the second closed-loop SCC2-1. The first area AR1-1 may be defined inside the second closed-loop SCC2-1, and the second area AR2-1 may be defined outside the second closed-loop SCC2-1.

For the convenience of explanation, the first closed-loop SCC1-1 is represented by a solid line, and the second closed-loop SCC2-1 is represented by a dotted line. The first closed-loop SCC1-1 may have a shape defined by two straight lines extending in the first direction DR1, one curved line connecting one ends of the two straight lines to each other and provided as a curve, and the other curved line connecting the other ends of the two straight lines to each other and provided as a curve.

The second closed-loop SCC2-1 may have a quadrangular shape defined by horizontal sides extending in the first direction DR1 and vertical sides SCC2-V1 extending in the second direction DR2.

The horizontal sides SCC2-H1 and the vertical sides SCC2-V1 may have different lengths from each other. For instance, the second closed-loop SCC2-1 may have a rectangular shape in which the horizontal sides SCC2-H1 are longer than the vertical sides SCC2-V1, but it should not be limited thereto or thereby. That is, the second closed-loop shape SCC2-1 may have various shapes and should not be limited to a specific embodiment.

In this case, the second closed-loop SCC2-1 may linearly make contact with the first closed-loop SCC1-1. For instance, the horizontal sides SCC2-H1 of the second closed-loop SCC2-1 may be parallel and overlapped with the two straight lines of the first closed-loop SCC1-1. Accordingly, the horizontal sides SCC2-H1 of the second closed-loop SCC2-1 are represented by the solid line to be overlapped with the first closed-loop SCC1-1.

The second area AR2-1 may include a first sub-area AR2-A and a second sub-area AR2-B.

As shown, the first sub-area AR2-A and the second sub-area AR2-B are spaced apart from each other and face each other such that the first area AR1-1 is disposed between the first and second sub-areas AR2-A and AR2-B. The first sub-area AR2-A and the second sub-area AR2-B may be defined to face each other in the first direction DR1.

However, according to other embodiments, the first and second sub-areas AR2-A and AR2-B may be defined at various positions as long as the first and second sub-areas AR2-A and AR2-B are disposed respectively adjacent to sides different from each other among sides defining the second closed-loop SCC2-1, and the first and second sub-areas AR2-A and AR2-B should not be limited to a specific embodiment. In addition, the second area AR2-1 may further include an additional area in addition to the first and second sub-areas AR2-A and AR2-B.

Figure 10B:
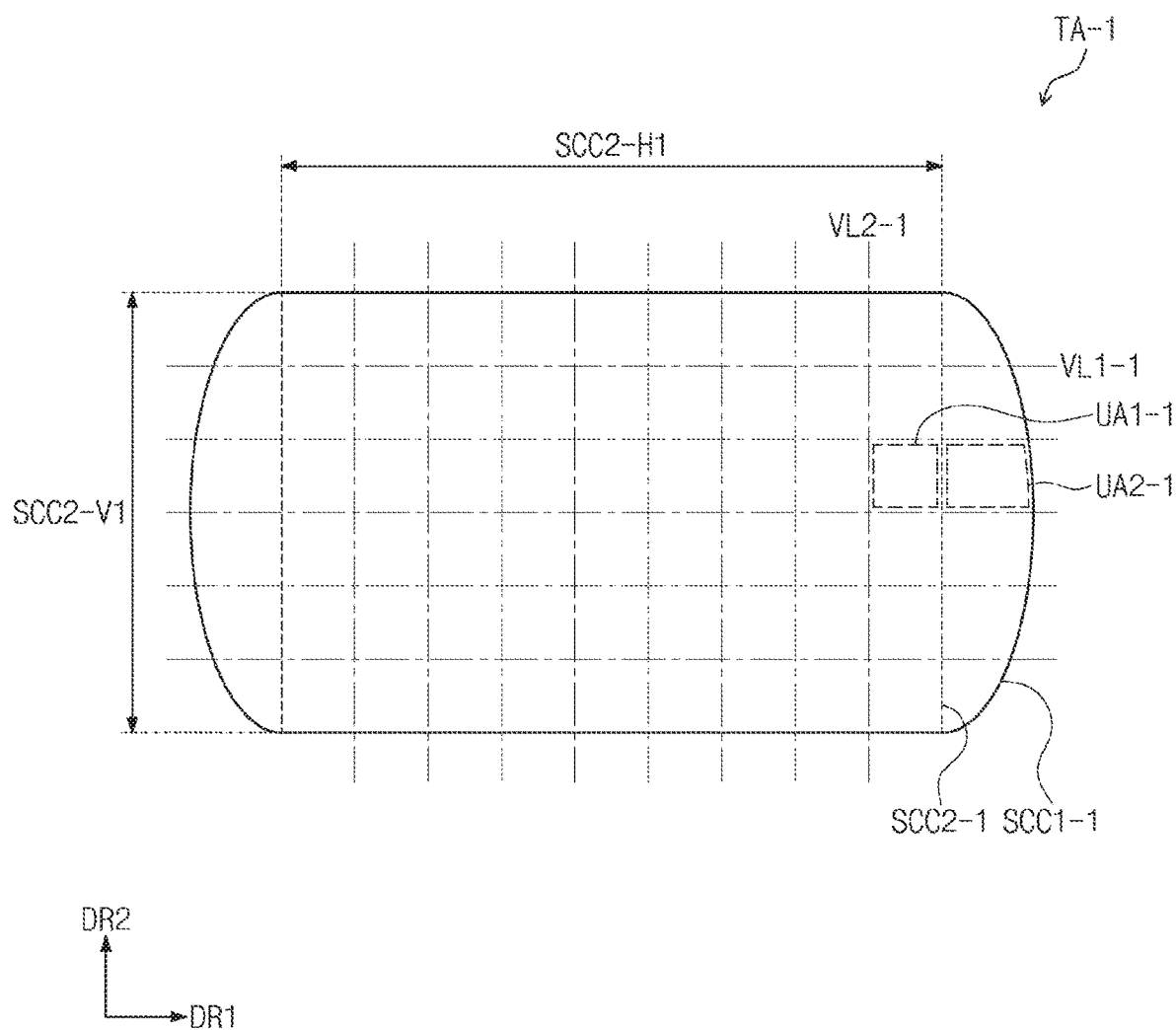

Referring to FIG. 10B, predetermined imaginary lines may be defined in the touch area TA-1 by a controller or other means known in the art. The imaginary lines may include a plurality of first imaginary lines VL1-1 and a plurality of second imaginary lines VL2-1. The first imaginary lines VL1-1 extend in the first direction DR1, and the second imaginary lines VL2-1 extend in the second direction DR2.

The number of the first imaginary lines VL1-1 may be different from the number of the second imaginary lines VL2-1. As shown in FIG. 10B, the number of the second imaginary lines VL2-1 may be greater than the number of the first imaginary lines VL1-1.

The first imaginary lines VL1-1 and the second imaginary lines VL2-1 may divide each of the first area AR1-1 and the second area AR2-1 into a plurality of unit areas. Among the unit areas, each of first unit areas UA1-1 defined in the first area AR1-1 may have a square shape. The shape of each of the first unit area UA1-1 may correspond to the first unit areas UA1 shown in FIG. 6B.

As shown, the second imaginary lines VL2-1 are not overlapped with the second area AR2-1. Accordingly, the second area AR2-1 may be divided into a plurality of second unit areas UA2-1 by the first imaginary lines VL1-1. The second unit areas UA2-1 may be arranged in a line along the second direction DR2 in each of the first sub-area AR2-A and the second sub-area AR2-B.

Figure 10C:
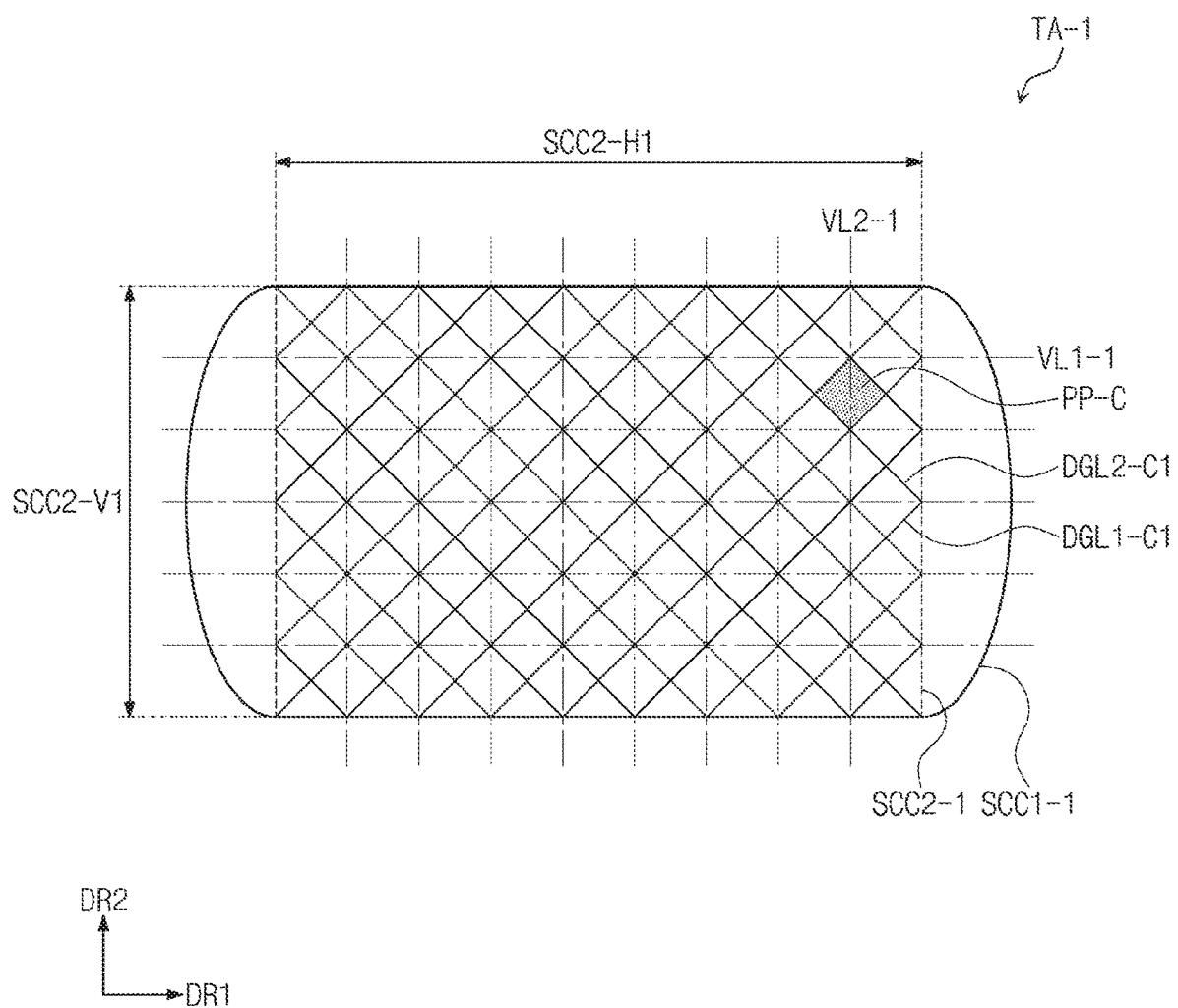

As shown in FIG. 10C, center patterns PP-C1 of the patterns may be defined by diagonal lines DGL1-C1 and DGL2-C1 of each of the first unit areas UA1-1. Outer lines of the center patterns PP-C1 may be defined by first and second center diagonal lines DGL1-C1 and DGL2-C1 of each of the first unit areas UA1-1.

Figure 10D:
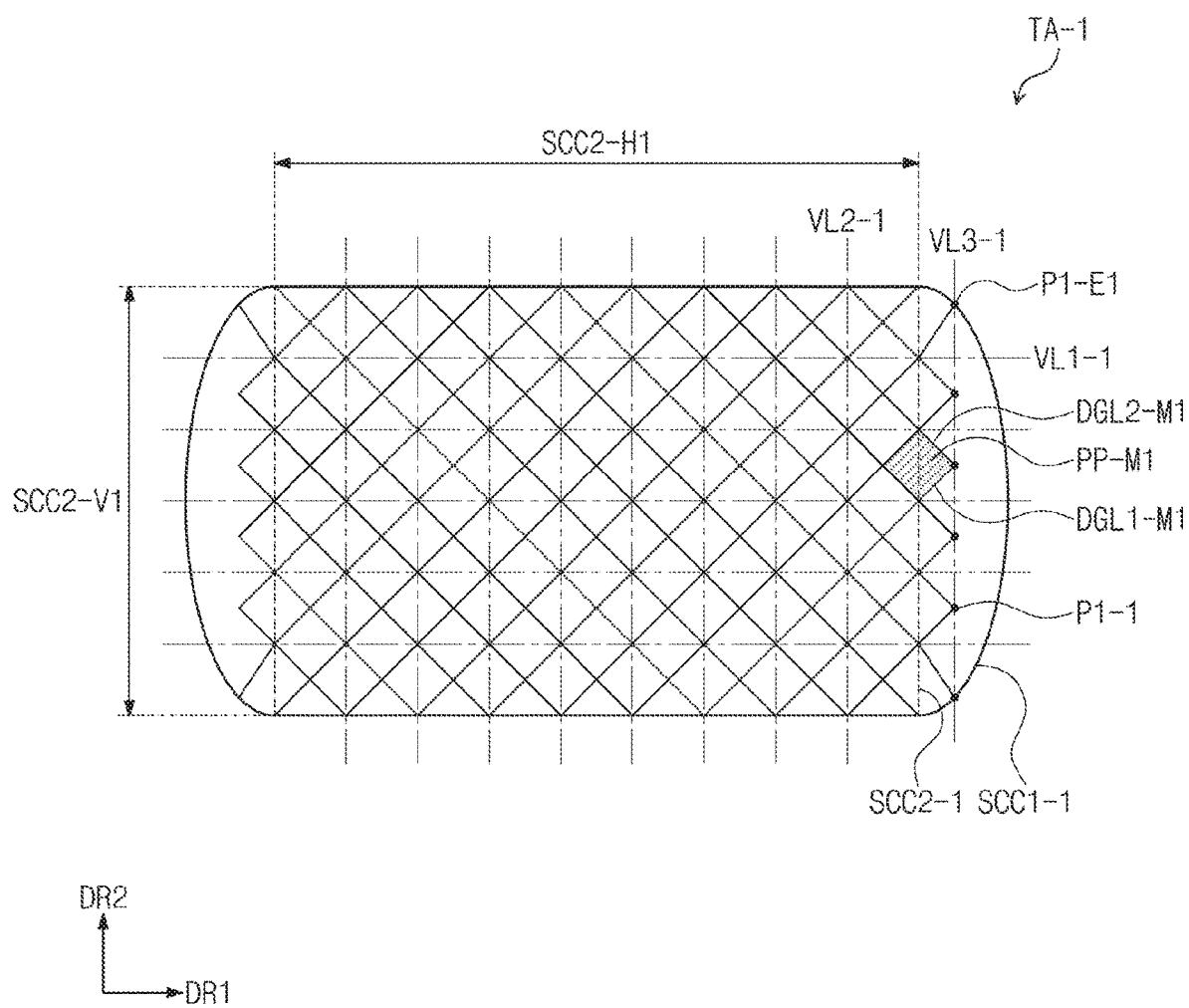

Referring to FIG. 10D, overlap patterns PP-M1 of the patterns may be defined by first and second overlap diagonal lines DGL1-M1 and DGL2-M1 defined in the second area AR2-1. Each of the overlap patterns PP-M1 is overlapped with the first area AR1-1 and the first sub-area AR2-A or the first area AR1-1 and the second sub-area AR2-B.

The imaginary lines may further include a plurality of third imaginary lines VL3-1 defined in the second area AR2-1. The third imaginary lines VL3-1 extend in the second direction DR2 to overlap with the first sub-area AR2-A and the second sub-area AR2-B. The third imaginary lines VL3-1 are overlapped with the outer line defining the second area AR2-1 of the touch area TA-1.

Each of the third imaginary lines VL3-1 may be defined by connecting first points P1-1 at which diagonal lines DGL1-M1 and DGL2-M1 respectively defining the overlap patterns PP-M1 cross each other. The outer line of the overlap patterns PP-M1 may be defined by the first and second center diagonal lines DGL1-C1 and DGL2-C1 of the first unit areas UA1-1 and the first and second overlap diagonal lines DGL1-M1 and DGL2-M1 of the second area AR2-1. The overlap patterns PP-M1 may have substantially the same shape as that of the center patterns PP-C1.

Figure 10E:
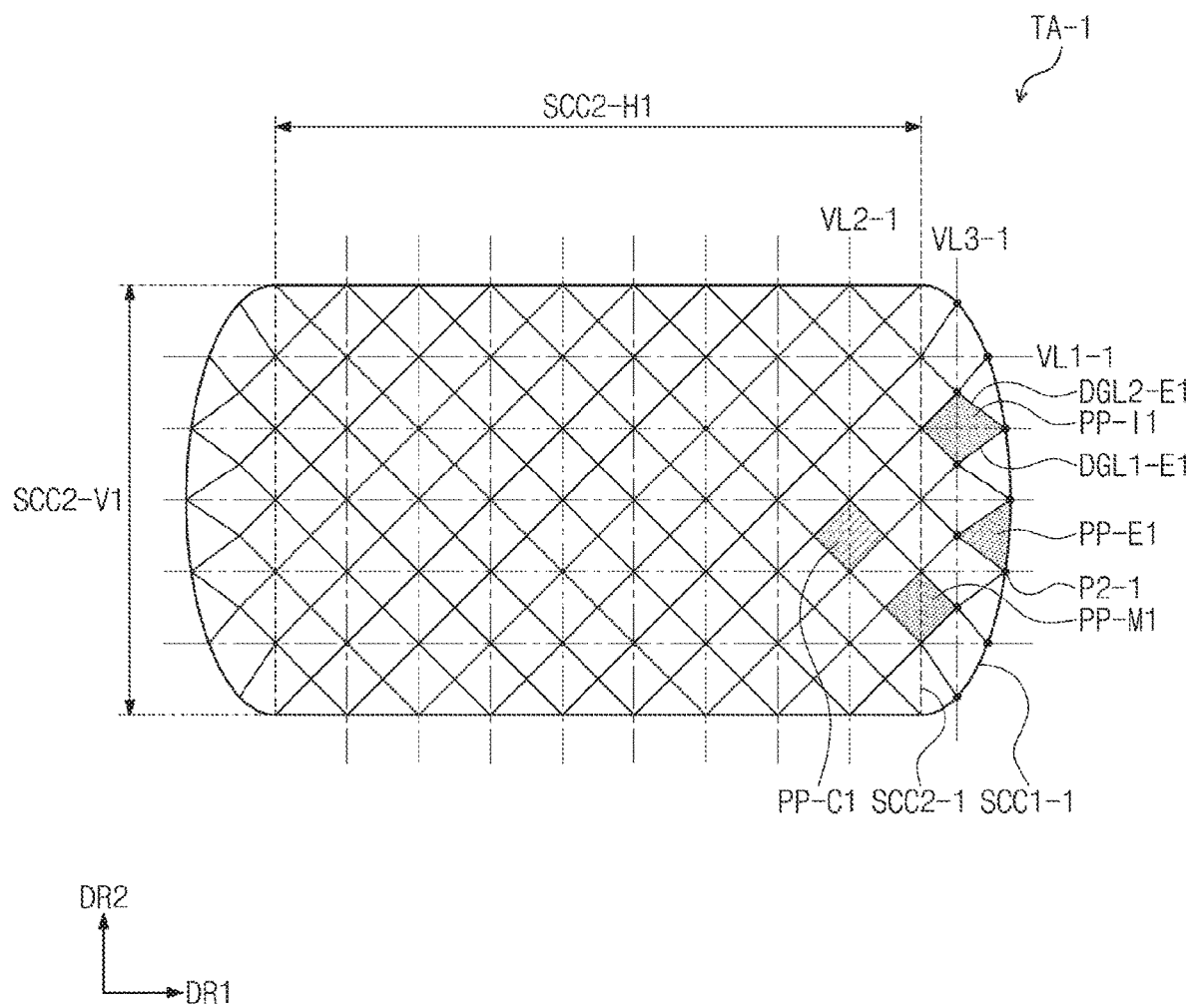

As shown in FIG. 10E, first and second edge diagonal lines DGL1-E1 and DGL2-E1 extending from the first points P1-1 and the edge points P1-E may be overlapped with the outer line of the touch area TA-1 at the second points P2-1. Outer lines of the edge patterns PP-E1 may be defined by connecting the first and second overlap diagonal lines DGL1-M1 and DGL2-M1 shown in FIG. 10D, the first and second edge diagonal lines DGL1-E1 and DGL2-E1 shown in FIG. 10E, and the outer line of the touch area TA-1.

The first and second edge diagonal lines DGL1-E1 and DGL2-E1 may extend in different directions from those in which the first and second overlap diagonal lines DGL1-M1 and DGL2-M1 extend. In addition, the first and second edge diagonal lines DGL1-E1 and DGL2-E1 may extend in different directions from those in which the first and second center diagonal lines DGL1-C1 and DGL2-C1 extend.

Accordingly, the edge patterns PP-E1 may have a different shape from that of the center patterns PP-C1 and the overlap patterns PP-M1. The touch sensing unit TSU-1 may control the direction in which the first and second edge diagonal lines DGL1-E and DGL2-E extend to control the shape and the area of the edge patterns PP-E1.

Figure 10F:
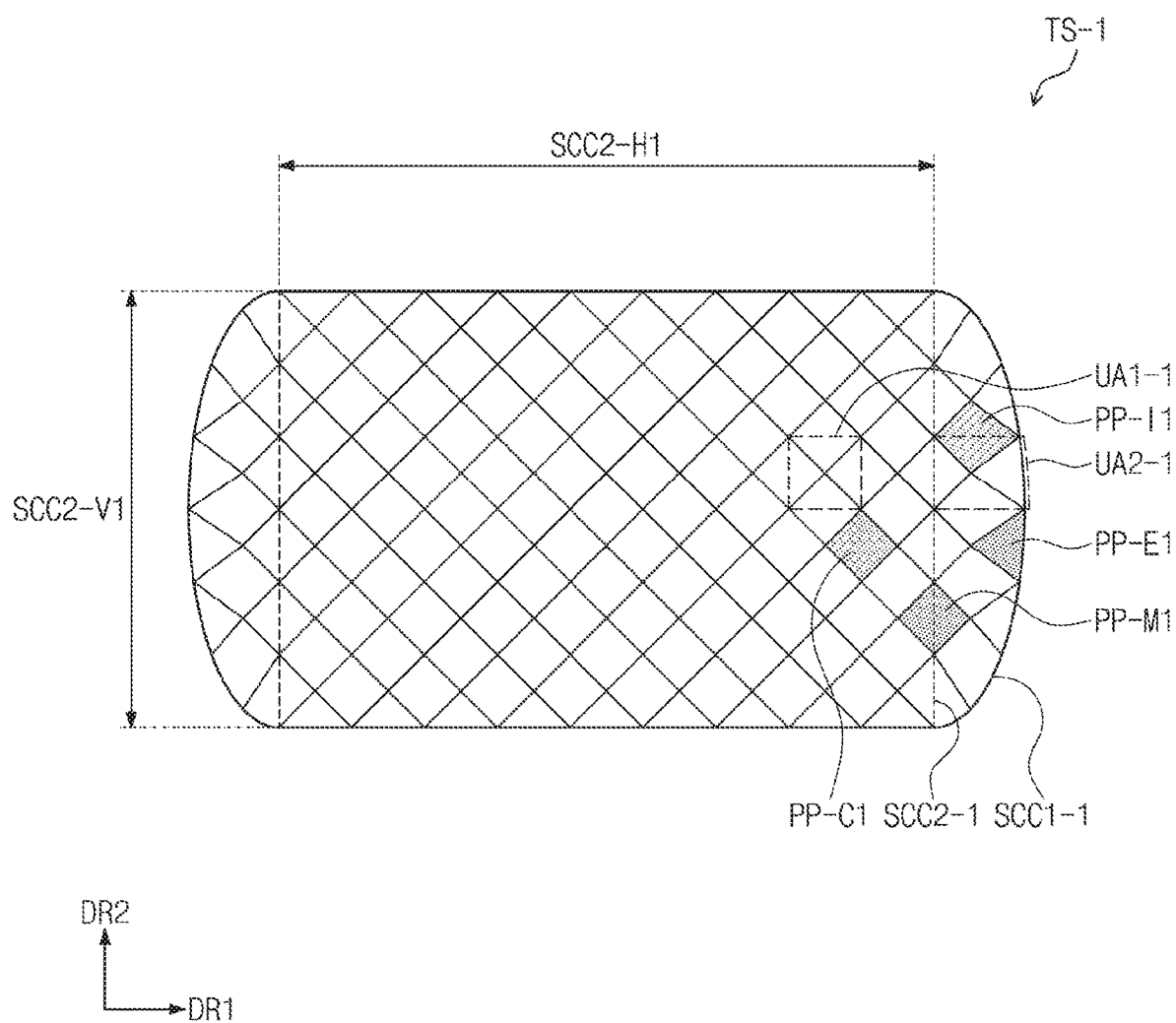

FIG. 10F shows the touch sensor TS-1 from which the driving line DL (refer to FIG. 2) is omitted. The touch sensor TS-1 includes patterns shown in FIGS. 10A to 10E. FIG. 10F shows one first unit area UA1-1 and one second unit area UA2-1.

The first unit area UA1-1 may correspond to the area AA' shown in FIG. 2 and the first unit area UA1 shown in FIG. 6F. Accordingly, portions of four center patterns PP-C1 among the center patterns PP-C1 may be disposed to be included in the first unit area UA1-1 to have the same area ratio.

The second unit area UA2-1 may correspond to the area BB' shown in FIG. 2 and the second unit area UA2 shown in FIG. 6F. Accordingly, a portion of one overlap pattern PP-M1, a portion of the edge pattern PP-E1 facing the overlap pattern PP-M1, and a portion of each of two edge patterns PP-E1 disposed adjacent to the overlap pattern PP-M1.

An area of the edge pattern PP-E1 facing the overlap pattern PP-M1 in the second unit area UA2-1 may be substantially equal to or greater than an area of the overlap pattern PP-M1 in the second unit area UA2-1. The area of the overlap pattern PP-M1 in the second unit area UA2-1 may be substantially the same as an area of one center pattern PP-C1 in the first unit area UA1-1.

An area activated to sense the touch in the second unit area UA2-1 may be similar to an area activated to sense the touch in the first unit area UA1-1. Accordingly, the touch sensor TS-1 may provide uniform touch sensitivity in the center area of the touch area TA-1 corresponding to the first unit area UA1-1 and in the edge area of the touch area TA-1 corresponding to the second unit area UA2-1.

Figure 11A:
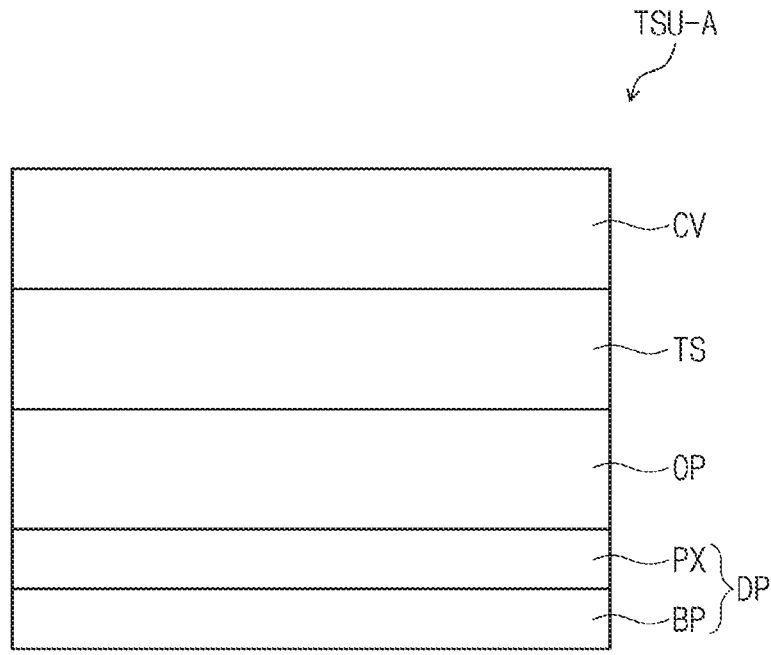
FIG. 11A, FIG. 11B and FIG. 11C are cross-sectional views showing exemplary touch sensing units constructed according to the principles of the invention.
Figure 11B:
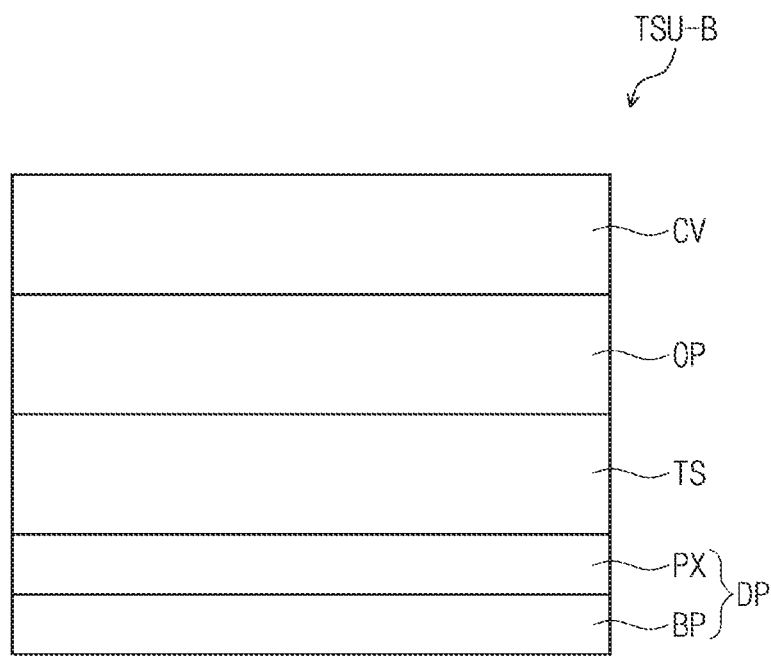
Figure 11C:
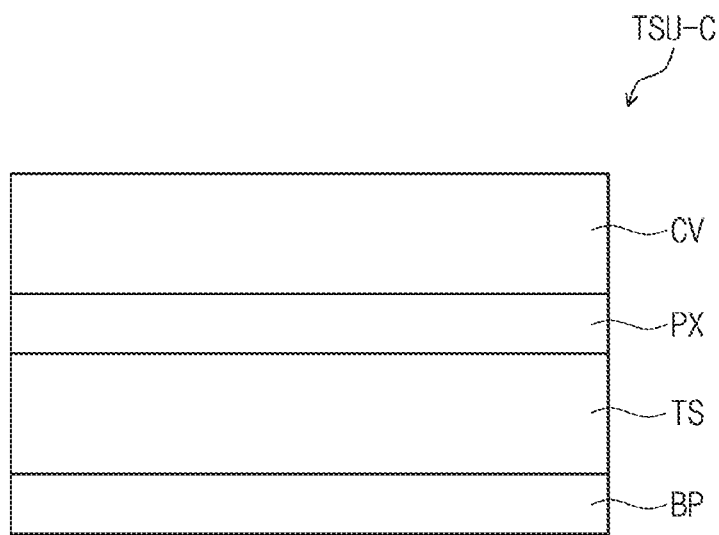

FIGS. 11A to 11C are cross-sectional views showing touch sensing units TSU-A, TSU-B, and TSU-C. Hereinafter, the touch sensing units TSU-A, TSU-B, and TSU-C will be described in detail with reference to FIGS. 11A to 11C.

Referring to FIG. 11A, the touch sensing unit TSU-A may further include a display member DP, an optical member OP, and a cover member CV.

The display member DP displays an image in response to electrical signals applied thereto. Accordingly, the touch sensing unit TSU-A may be, but is not limited to, a touch screen device that senses the touch by the user and substantially simultaneously displays the image to the user.

The display member DP may include a base part BP and a pixel part PX. The base part BP may be a base layer on which components of the touch sensing unit TSU-A are disposed. The base part BP may be an insulating substrate or an insulating film.

The pixel part PX may include at least one display device. The display device may implemented in various ways. For instance, the display device may be at least one of a liquid crystal capacitor, an organic light emitting device, an electrophoretic device, and an electrowetting device. The display device should not be limited to a specific embodiment as long as the display device generates a light in response to the electrical signal or controls a path of the light incident to the display device.

The optical member OP may be disposed on the display member DP. For instance, the optical member OP may be a polarizing member, a color filter, or a wavelength filter. The optical member OP may control the light incident thereto to improve display characteristics of the touch sensing unit TSU-A.

The touch sensor TS may be disposed on the display member DP. In this case, the patterns PP (refer to FIG. 2) constituting the touch sensor TS may include a material with relatively high light transmittance. Although the touch sensor TS is provided, the user may easily perceive the image displayed by the display member DP disposed under the touch sensor TS.

Meanwhile, in a case where the patterns PP of the touch sensor TS have a mesh structure, mesh lines defining each pattern PP may be disposed in an area that does not interfere with the image implemented by the pixel part PX. Accordingly, although the electronic device shown includes the touch sensor TS formed of an opaque material, the image may be easily perceived by the user.

In addition, the touch sensor TS may be disposed on the optical member OP. The touch sensor TS may be directly disposed on the optical member OP. In this case, the base member BS shown in FIG. 2 may be substantially the optical member OP. Therefore, the patterns and the driving circuit DL (refer to FIG. 2) of the touch sensor TS may be directly disposed on the optical member OP.

Alternatively, the touch sensor TS may be attached onto the optical member OP by an adhesive member. In this case, the base member BS of the touch sensor TS may be attached to the optical member OP through the adhesive member.

The driving circuit DC (refer to FIG. 2) connected to the touch sensor TS may be formed on the same layer as the touch sensor TS, disposed under the touch sensing unit TSU-A after being separately provided, or disposed on the additional unit AC (refer to FIG. 1). The driving circuit DC may be provided on the same substrate as the driving circuit of the display member DP or provided separately from the driving circuit of the display member DP.

The cover member CV may be disposed on the touch sensor TS. The cover member CV protects the optical member OP, the display member DP, and the touch sensor TS from the outside.

The cover member CV may include a material with high light transmittance. Thus, the image displayed through the display member DP may be easily perceived by the user.

Referring to FIG. 11B, a touch sensor TS of the touch sensing unit TSU-B may be disposed between the optical member OP and the display member DP. In this case, the optical member OP may prevent the touch sensor TS from being perceived by the user.

Referring to FIG. 11C, a touch sensor TS of the touch sensing unit TSU-C may be disposed between the base part BS and the pixel part PX. In this case, the touch sensor TS may be disposed in the display member DP shown in FIG. 11A. The touch sensing unit TSU-C according to the exemplary embodiment included the touch sensor TS disposed under the pixel part PX, and thus the electronic device may be implemented in a thin shape.

Although certain exemplary embodiments and implementations have been described herein, other embodiments and modifications will be apparent from this description. Accordingly, the inventive concepts are not limited to such embodiments, but rather to the broader scope of the presented claims and various obvious modifications and equivalent arrangements.

What is claimed is:

1. An electronic device comprising:
a base member comprising a touch area defined inside a first closed-shape, the first closed-shape being defined by a first imaginary line, and a peripheral area disposed adjacent to the touch area and defined outside the first closed-shape, the first imaginary line comprising a curved line; and
a touch sensor comprising a plurality of patterns disposed in the touch area to sense a touch from outside and a driving line disposed in the peripheral area and connected to a pattern disposed adjacent to the first closed-shape, wherein the touch area comprises a first area defined inside a second closed-shape, the second closed-shape being defined by a second imaginary line defined in the touch area, and a second area defined outside the second closed-shape and surrounded by the first closed-shape, and edge patterns disposed in the second area and comprising one side portion adjacent the first imaginary line,
wherein:
at least some of the edge patterns have a fan shape;
the one side portion of at least one of the edge patterns having the fan shape has a curved line;
one side of a center pattern disposed in the first area extends in a first diagonal direction, the other side of the center pattern extends in a second diagonal direction crossing the first diagonal direction; and
other side portions of the at least one of the edge patterns having the fan shape extend in directions different from the first diagonal direction and the second diagonal direction.

2. The electronic device of claim 1, wherein the second closed-shape has a polygonal shape defined by a plurality of vertices and a plurality of sides that are straight lines and connect the vertices.

3. The electronic device of claim 1, wherein each of the vertices is overlapped with the first closed-shape.

4. The electronic device of claim 2, wherein the second area is surrounded by a side connecting the vertices overlapped with a portion of the first closed-shape that is the curved line.

5. The electronic device of claim 4, wherein the first closed-shape comprises a first portion that is the curved line and a second portion that is a straight line, and one side of the second closed-shape is parallel to and overlapped with the second portion.

6. The electronic device of claim 4, wherein the first closed-shape has a circular shape or an oval shape, which circumscribes the second closed-shape, and the second area comprises a plurality of areas surrounded by the sides of the second closed-shape.

7. The electronic device of claim 4, wherein at least one side portion of the edge pattern is adjacent to the portion of the first closed-shape.

8. The electronic device of claim 4, wherein the plurality of patterns further comprise an overlap pattern overlapped with one of the plurality of sides of the second closed-shape, the overlap pattern being overlapped with each of the first area and the second area, and the edge pattern being electrically connected to the overlap pattern.

9. The electronic device of claim 8, wherein the overlap pattern has a shape substantially linearly symmetrical with respect to the one of the plurality of sides.

10. The electronic device of claim 8, wherein the overlap pattern has substantially the same shape as the center pattern.

11. The electronic device of claim 8, wherein the second closed-shape has a square shape, the first area comprises a plurality of first unit areas arranged in a matrix form defined by a plurality of third imaginary lines, each extending in a direction parallel to the one of the plurality of sides and a plurality of fourth imaginary lines each extending in a direction intersecting the one of the plurality of sides, and each of the first unit areas is overlapped with a portion of each of four center patterns disposed adjacent to each other.

12. The electronic device of claim 11, wherein diagonal lines of each of the first unit areas define an outer portion of each of the center patterns closest to the first closed-shape.

13. The electronic device of claim 11, wherein the second area comprises a plurality of second unit areas distinguished from each other by the fourth imaginary lines and arranged in a line along the one of the plurality of sides, and each of the second unit areas is overlapped with a portion of the overlap pattern, a portion of the edge pattern, and portions of two intermediate patterns disposed between the overlap pattern and the edge pattern and electrically insulated from the overlap pattern and the edge pattern.

14. The electronic device of claim 13, wherein an area of one center pattern with respect to one of the first unit areas is substantially equal to an area of another center pattern of the first unit area.

15. The electronic device of claim 13, wherein an area of one edge pattern of the second unit areas is substantially equal to or greater than an area of the overlap pattern.

16. The electronic device of claim 13, wherein the second area further comprises a plurality of third unit areas spaced apart from each other such that the second unit areas are disposed between the third unit areas, each of the third unit areas is surrounded by one of the fourth imaginary lines, the one of the plurality of sides of the second closed-shape, and the one portion of the first closed-shape, and each of the third unit areas is adjacent to each of two patterns electrically insulated from each other.

17. The electronic device of claim 8, wherein the patterns comprise:
a plurality of first sensor patterns arranged in the direction in which the one of the plurality of sides extends;
a plurality of first connection patterns each extending in the direction in which the one of the plurality of sides extends to connect the first sensor patterns adjacent to each other;
a plurality of second sensor patterns arranged in a direction intersecting the one of the plurality of sides; and
a plurality of second connection patterns each extending in the direction intersecting the one of the plurality of sides and being insulated from the first connection patterns while intersecting the first connection patterns to connect the second sensor patterns adjacent to each other, and each of the edge pattern, the overlap pattern, and the center pattern is one of the first sensor patterns and the second sensor patterns.

18. The electronic device of claim 17, wherein the overlap pattern and the edge pattern respectively correspond to two second sensor patterns connected to each other by one of the second connection patterns.

19. The electronic device of claim 1, wherein the driving line is disposed along the first closed-shape adjacent to the touch area.

20. The electronic device of claim 19, wherein each of the driving line and the edge pattern is provided in a plural number, and at least one edge pattern of the edge patterns is connected to one of the driving lines.

21. The electronic device of claim 20, wherein one of the edge patterns comprises a sensing portion overlapped with the touch area and a joining portion extending from the sensing portion to the peripheral area, and the one driving line of the driving lines being connected to the joining portion.

22. The electronic device of claim 1, further comprising a pixel part disposed on the base member to display an image, the pixel part comprising a plurality of pixels.

23. The electronic device of claim 22, wherein the pixel part is disposed between the touch sensor and the base member or on the touch sensor.

24. The electronic device of claim 1, wherein the first closed-shape comprises a closed shape defined at least in part by a curved line and the second closed-shape is a closed shape defined at least in part by a straight line.

25. The electronic device of claim 1, wherein each of the edge patterns has an area substantially equal to or greater than approximately one-half of an area of the center pattern.

26. The electronic device of claim 1, wherein the other side portions of the at least one of the edge patterns having the fan shape have different lengths.

* * * * *